(12) United States Patent
Zhang et al.

(10) Patent No.: US 10,223,552 B2
(45) Date of Patent: Mar. 5, 2019

(54) PRIVACY PROTECTION METHOD IN A TERMINAL DEVICE AND THE TERMINAL DEVICE

(71) Applicant: SAMSUNG ELECTRONICS CO., LTD., Suwon-si (KR)

(72) Inventors: Li Zhang, Beijing (CN); Rui Wu, Beijing (CN); Zhenbo Luo, Beijing (CN); Tang Tang, Beijing (CN)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 0 days.

(21) Appl. No.: 15/390,144

(22) Filed: Dec. 23, 2016

(65) Prior Publication Data
US 2017/0185808 A1    Jun. 29, 2017

(30) Foreign Application Priority Data

Dec. 24, 2015  (CN) .......................... 2015 1 0983094
Dec. 5, 2016   (KR) ....................... 10-2016-0164391

(51) Int. Cl.
G06F 21/84   (2013.01)
H04M 1/725  (2006.01)
G06F 21/62   (2013.01)

(52) U.S. Cl.
CPC .......... G06F 21/84 (2013.01); G06F 21/6245 (2013.01); H04M 1/72577 (2013.01)

(58) Field of Classification Search
CPC ...................................................... G06F 21/84
USPC ........................................................ 726/20
See application file for complete search history.

(56) References Cited

U.S. PATENT DOCUMENTS

| | | | |
|---|---|---|---|
| 8,811,951 B1* | 8/2014 | Faaborg | H04M 1/57 340/384.1 |
| 2005/0010553 A1* | 1/2005 | Liu | G06F 17/30265 |
| 2006/0015894 A1 | 1/2006 | Nishinaga et al. | |
| 2011/0179366 A1 | 7/2011 | Chae | |
| 2012/0019456 A1 | 1/2012 | Choi et al. | |
| 2012/0131471 A1 | 5/2012 | Terlouw et al. | |
| 2013/0108105 A1 | 5/2013 | Yoo et al. | |
| 2014/0287723 A1* | 9/2014 | LaFever | H04W 12/02 455/411 |

(Continued)

FOREIGN PATENT DOCUMENTS

| | | |
|---|---|---|
| KR | 10-2007-0016211 A | 2/2007 |
| KR | 10-0753362 B1 | 8/2007 |
| KR | 10-2014-0047312 A | 4/2014 |

OTHER PUBLICATIONS

Search Report (PCT/ISA/210) dated Mar. 31, 2017, issued by the International Searching Authority in counterpart International Patent Application No. PCT/KR2016/015108.

(Continued)

Primary Examiner — Jacob Lipman
(74) Attorney, Agent, or Firm — Sughrue Mion, PLLC

(57) ABSTRACT

A privacy protection method and a terminal device are provided. The privacy protection method in a terminal device includes receiving a user input of designated multimedia content that is stored in the terminal device, detecting an activation of a privacy mode on the terminal device, determining a set of private multimedia content stored in the terminal device based on the designated multimedia content, and preventing the set of private multimedia content from being displayed on the terminal device.

17 Claims, 38 Drawing Sheets

(56) References Cited

U.S. PATENT DOCUMENTS

2015/0100908 A1    4/2015  Magistrado et al.

OTHER PUBLICATIONS

Written Opinion (PCT/ISA/237) dated Mar. 31, 2017, issued by the International Searching Authority in counterpart International Patent Application No. PCT/KR2016/015108.

* cited by examiner

FIG. 10A

| INSTRUCTIONS | VOICE COMMANDS |
|---|---|
| INSTRUCTION FOR SHOWING DESIGNATED MULTIMEDIA CONTENT | SHOW IMAGES |
| INSTRUCTION FOR HIDING DESIGNATED MULTIMEDIA CONTENT | HIDE IMAGES |
| CONFIRMATION INSTRUCTION | CONFIRM SELECTIONS |
| ⋮ | ⋮ |

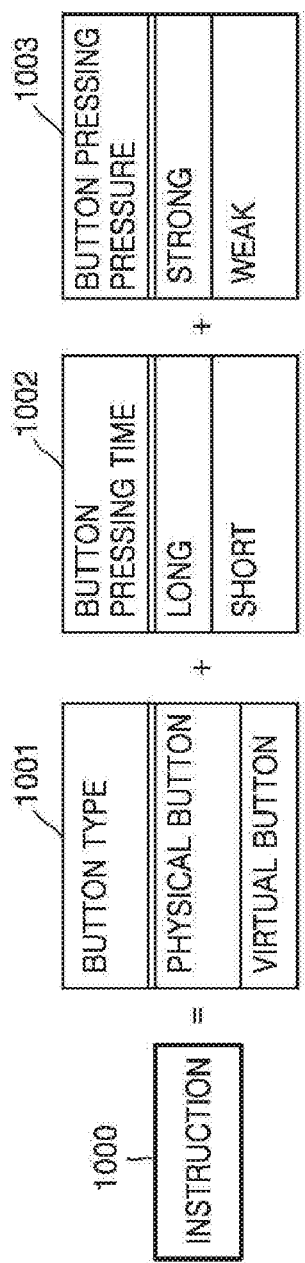

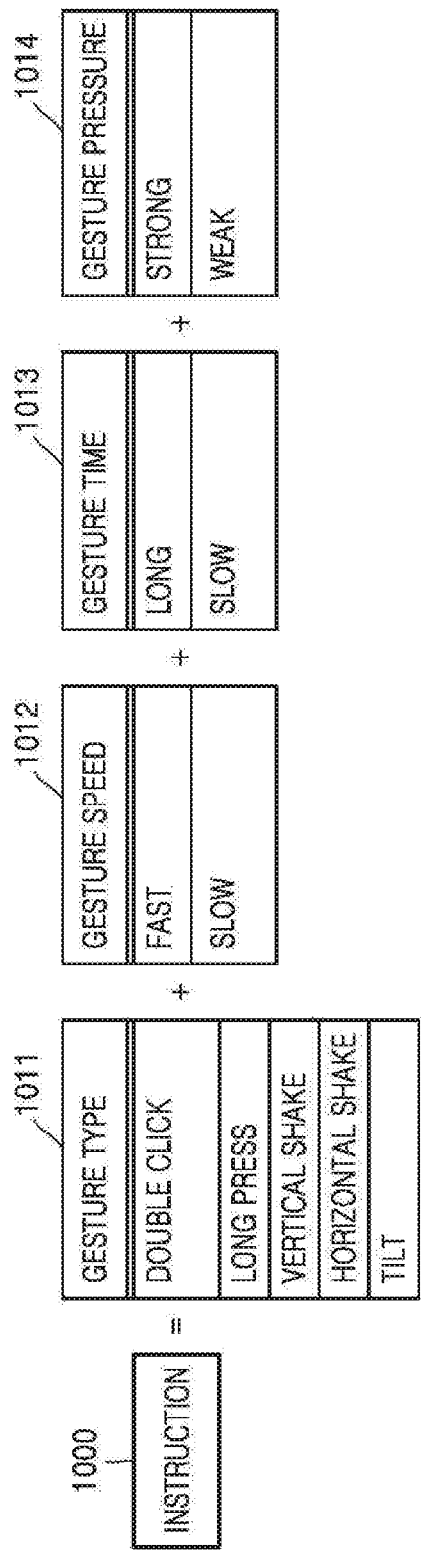

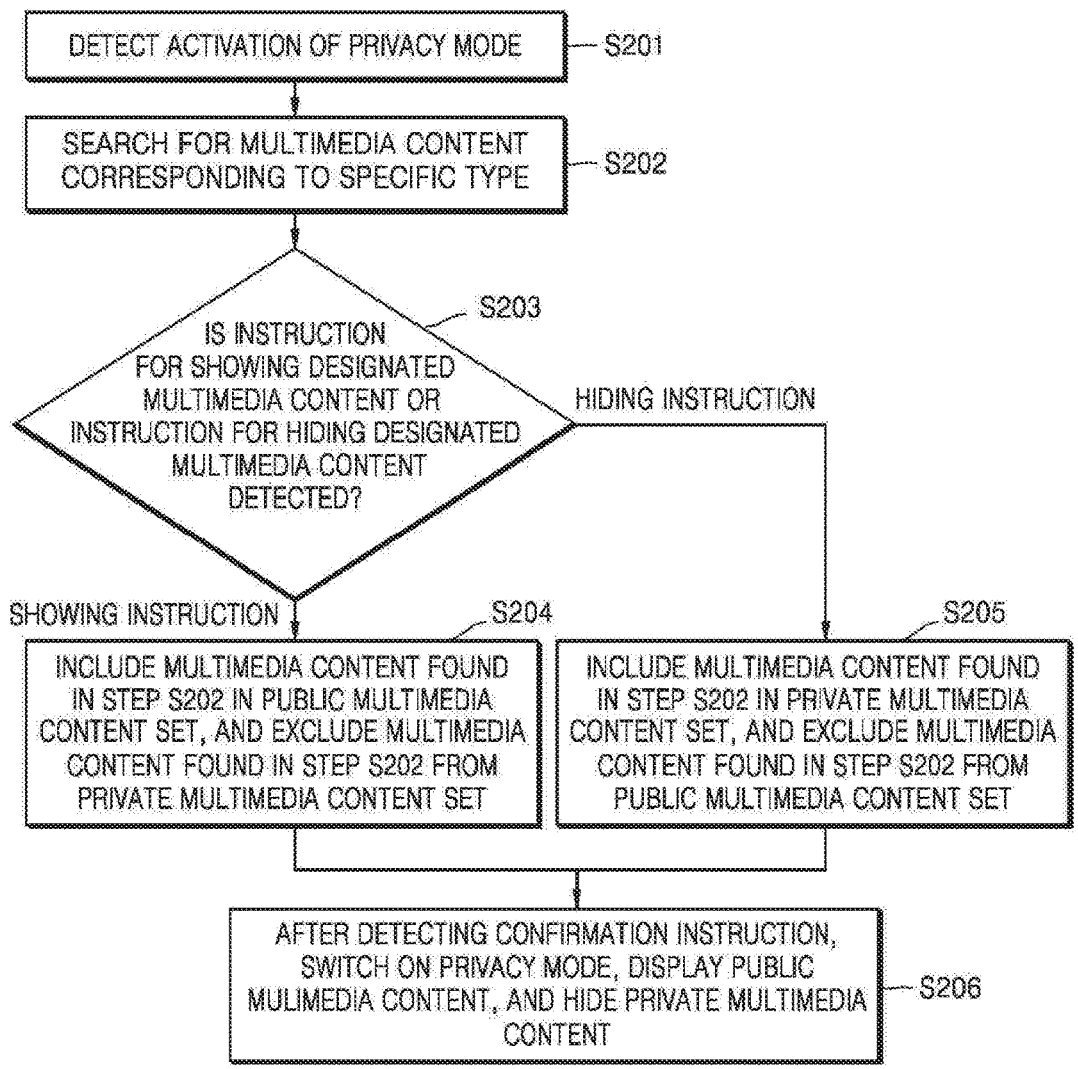

PRIVACY PROTECTION METHOD IN A TERMINAL DEVICE AND THE TERMINAL DEVICE

CROSS-REFERENCE TO RELATED APPLICATIONS

This application claims priority from Chinese Patent Application No. 201510983094.3, filed on Dec. 24, 2015 in the State Intellectual Property Office of the People's Republic of China, and Korean Patent Application No. 10-2016-0164391, filed on Dec. 5, 2016 in the Korean Intellectual Property Office, the disclosures of which are incorporated herein in their entireties by reference.

BACKGROUND

1. Field

Apparatuses and methods consistent with exemplary embodiments relate to a terminal device and an operating method thereof, and more particularly, to a privacy protection method and apparatus.

2. Description of the Related Art

Along with the development of communication technology, terminal devices such as mobile phones and tablet computers are becoming increasingly prevalent and providing more functions.

Users may use terminal devices to capture photos or videos, make phones calls, send text messages, exchange instant messages, or surf the Internet. Accordingly, an increasing amount of private information, such as photos, videos, a call history, message records, a web search history, and a chat history, is being stored on these personal devices. Accordingly, when these terminal devices are used by people other than the owner of the device, there is a risk of leaking private information.

SUMMARY

Provided are a terminal device that provides privacy protection, and a privacy protection method thereof.

According to an aspect of an exemplary embodiment, a privacy protection method in a terminal device includes receiving a user input of designated multimedia content that is stored in the terminal device; detecting an activation of a privacy mode on the terminal device; determining a set of private multimedia content stored in the terminal device, based on the designated multimedia content; and preventing the set of private multimedia content from being displayed on the terminal device.

According to an aspect of another exemplary embodiment, a terminal device includes a displaying module; and a processor configured to receive a user input of designated multimedia content that is stored in the terminal device, detect an activation of a privacy mode on the terminal device, determine a set of private multimedia content based on the designated multimedia content, and control the displaying module to hide the set of private multimedia content.

According to an aspect of another exemplary embodiment, a privacy protection method may include determining, by a first terminal device, a set of private multimedia content that is to be hidden while a privacy protection mode is activated on a second terminal device, based on designated multimedia content designated by a user, and transmitting, by the first terminal device, a configuration instruction corresponding to the set of private multimedia content to the second terminal device.

According to an aspect of another exemplary embodiment, a terminal device may include a communication module; and a processor configured to determine a set of private multimedia content set that is to be hidden while a privacy protection mode is activated on an external terminal device, based on designated multimedia content designated by a user, and control the communication module to transmit a configuration instruction corresponding to the set of private multimedia content to the external terminal device.

BRIEF DESCRIPTION OF THE DRAWINGS

The above and/or other aspects will become apparent and more readily appreciated from the following description of exemplary embodiments, taken in conjunction with the accompanying drawings in which:

FIG. 10A is a diagram showing an example of generating a privacy-mode-related instruction with a voice according to an exemplary embodiment;

FIG. 10B is a diagram showing an example of generating a privacy-mode-related instruction with a button according to an exemplary embodiment;

FIG. 10C is a diagram showing an example of generating a privacy-mode-related instruction with a gesture according to an exemplary embodiment;

FIG. 11 is a flowchart showing a privacy protection method according to an exemplary embodiment;

DETAILED DESCRIPTION

Figure 1:
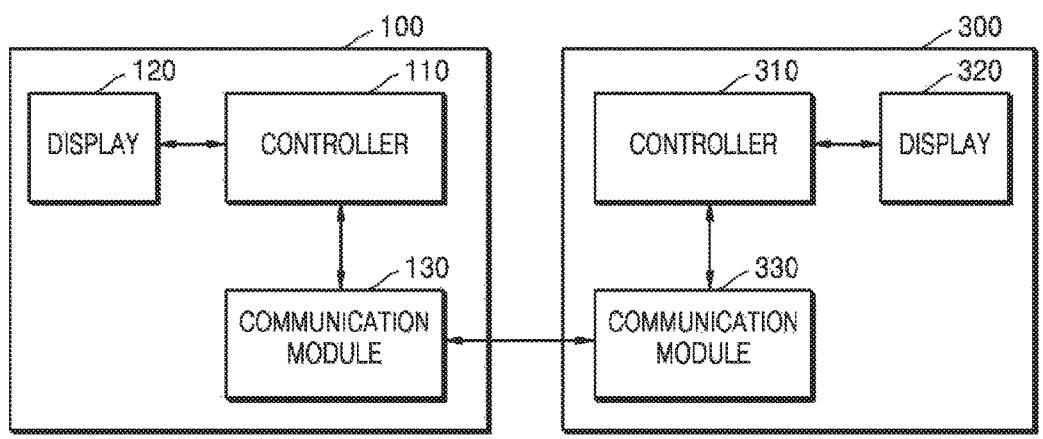
FIG. 1 is a schematic diagram of a system including a terminal device and an external control device that communicates with the terminal device according to an exemplary embodiment.

The present disclosure will be described in further detail hereinafter with reference to accompanying drawings and embodiments to make the objective, technical solution and merits therein clearer.

Exemplary embodiments provide a privacy protection method and a apparatus thereof. In the privacy protection method provided by the present disclosure, the terminal device detects the activation of the privacy mode, determines a private multimedia content set based on designated multimedia content and hides the private multimedia content set. Among the multimedia content saved in the terminal device, content excluding those in the private multimedia content set forms a public multimedia content set. After determining the private multimedia content set, the terminal device is able to determine the public multimedia content set accordingly. The terminal device hides the private multimedia content set and displays the public multimedia content set.

In the related art, the user has to select a multimedia file and hide the multimedia file via a menu, in order to activate privacy protection of the multimedia file. Thus, the user has to select and configure multimedia files one by one, which requires complicated operations and has low efficiency. In the privacy protection method provided by the exemplary embodiments of the present disclosure, after detecting that the privacy mode is switched on, the terminal device is able to determine all of the multimedia content that needs to be hidden based on the designated multimedia content and provide the protection. As such, it is possible to determine a privacy protection scope in real time. Because the user merely needs to designate a few items of multimedia content to determine the whole privacy protection scope, the user's operation is simplified and increased efficiency is achieved.

According to some embodiments, when determining the private multimedia content based on the designated multimedia content, it is possible to search stored multimedia content for those having the same semantic information with the designated multimedia content and determine the private multimedia content set based on the found multimedia content. The semantic information includes at least one of: object, number of objects, scene, and event.

When an instruction for showing the designated multimedia content is detected, the terminal device may determine not to include found multimedia content in the private multimedia content set. When an instruction for hiding the designated multimedia content is detected, the terminal device may determine to include the found multimedia content in the private multimedia content. When the designated multimedia content conforms to a hiding condition, the terminal device may determine to include the found multimedia content in the private multimedia content. When the designated multimedia content conforms to a showing condition, the terminal device may determine not to include the found multimedia content in the private multimedia content set. The hiding condition may include at least one of a condition that the designated multimedia content should include designated private information and a condition that a subject of the designated multimedia content should be a designated subject. For example, when a subject designated as the hiding condition by a user is <nude body>, the condition that a subject of the designated multimedia content should be a designated subject indicates that a subject of an image file designated by the user as being shown should be a nude body. The showing condition includes at least one of a condition that the designated multimedia content should not include the designated private information, a condition that the subject of the designated multimedia content should not be the designated subject, and a condition that the designated multimedia content should include multimedia content of a user who is using the terminal device. For example, when a subject designated as the showing condition by a user is <baby face>, the condition that a subject of the designated multimedia content should not be a designated subject indicates that a subject of multimedia content designated by the user as being shown should not include a baby's face.

The designated multimedia content may include at least one of the following examples. 1) Multimedia content in a designated multimedia file. For example, when a user designates one image file from photo album, the multimedia content in the designated multimedia file may be content of the image file designated by the user.

2) Content designated from a designated multimedia file. For example, when a user designates one image file and designates face A between face A and face B of content included in the image file, the designated multimedia file may be an image file, and the designated content may be face A.

3) Multimedia content corresponding to a designated subject. For example, when a user designates <sports>, the designated subject is <sports>, and the multimedia content corresponding to the designated subject may be multimedia content corresponding to sports.

4) Multimedia content corresponding to a subject of a designated multimedia file. For example, when a user designates an image file whose subject is sports, the designated multimedia file is an image file designated by the user, and the multimedia content corresponding to the subject of the designated multimedia file may be a subject of the image file designated by the user, that is, multimedia content corresponding to sports. The subject may be defined in various ways. Accordingly, when the user designates a soccer image file, the subject may be soccer or sports which is a concept involving soccer.

5) Multimedia content including a designated object. For example, when a user designates user A, the designated object may be user A, and the multimedia content including the designated object may be content including an image of user A.

6) Multimedia content including an object of a designated multimedia file. For example, when a user designates an image file containing an image of user A, the designated multimedia file is an image file designated by the user, and the multimedia content including an object of the designated multimedia file may be content including the image of user A included in the designated image file.

7) Multimedia content including designated private information. For example, when a user designates his or her credit information as private information, the multimedia content including the designated private information may be content including the credit information designated by the user.

8) Multimedia content including private information of a designated multimedia file. For example, when a user designates an image file including his or her credit information, the designated multimedia file is an image file designated by the user, and the multimedia content including private information of the designated multimedia file may be content including the credit information included in the image file designated by the user.

9) Multimedia content corresponding to a user type of a current user. For example, the user type may include whether a user who is using a terminal device is an owner of the terminal device or just a simple user who uses the terminal device. Accordingly, the multimedia content may include content corresponding to the owner of the terminal device and content corresponding to the simple user of the terminal device according to the user type.

10) Multimedia content corresponding to environment type of current environment. For example, an environment type of an environment where a terminal device is located may be determined on the basis of the global positioning system (GPS), an imaging apparatus, a voice, or environment information included in user settings such as a meeting mode or an outdoor mode. For example, the multimedia content corresponding to the environment type may include content corresponding to an indoor environment and content corresponding to an outdoor environment.

The multimedia content may include at least one of an image, a portion of an image, a video segment, a video image frame, a portion of a video image frame, audio, and an audio segment. The multimedia content may be captured by a user and stored in a terminal device, obtained from a network, or obtained by editing stored multimedia content.

FIG. 1 is a schematic diagram of a system including a terminal device and an external control device that communicates with the terminal device according to an exemplary embodiment.

Referring to FIG. 1, the system includes a terminal device 100 and an external control device 300.

The terminal device 100 may include a controller 110, a display 120, and a communication module 130.

The controller 110 may detect a switching-on (i.e., activation) of a privacy mode, determine a private multimedia content set on the basis of designated multimedia content, and hide the private multimedia content set. The controller 110 may include one or more processors. According to an embodiment, the controller 110 may discover multimedia content having semantic information corresponding to the designated multimedia content in order to determine the private multimedia content set on the basis of the designated multimedia content, and may determine the private multimedia content set on the basis of the discovered multimedia content.

According to an exemplary embodiment, an instruction for activating the privacy mode may be received from a user input or the external control device 300.

Under control of the controller 110, the display 120 may display a multimedia content set to be shown to a user and may hide a multimedia content set to be hidden from a user according to the activation of the privacy mode.

The communication module 130 enables communication between the terminal device 100 and the external control device 300. The communication module 130 may transmit state information of the terminal device 100 or data processed by the terminal device 100 to the external control device 300, or may receive a control instruction for the terminal device 100 from the external control device 300.

The external control device 300 may include a controller 310, a display 320, and a communication module 330.

The controller 310 serves to control all elements of the external control device 300, and may generate a control instruction for controlling the terminal device 100 and send the control instruction to the terminal device 100. The controller 310 may include one or more processors.

According to an exemplary embodiment, the controller 310 may determine a private multimedia content set during privacy protection of the terminal device 100 on the basis of designated multimedia content and control the communication module 330 to send a configuration instruction corresponding to the private multimedia content set to the terminal device 100.

According to an exemplary embodiment, when the controller 310 detects that the terminal device 100 has not yet switched on the privacy mode before determining the private multimedia content set that needs to be hidden during privacy protection of the terminal device 100, the controller 310 may control the communication module 330 to send a privacy mode switch-on instruction to the terminal device 100.

The display 320 is configured to display data processed by the controller 310, and may provide a user interface for receiving a user input.

The communication module 330 may receive state information of the terminal device 100 or data processed by the terminal device 100 from the terminal device 100 and transmit one or more control instructions generated by the controller 310 to the terminal device 100.

Figure 2:
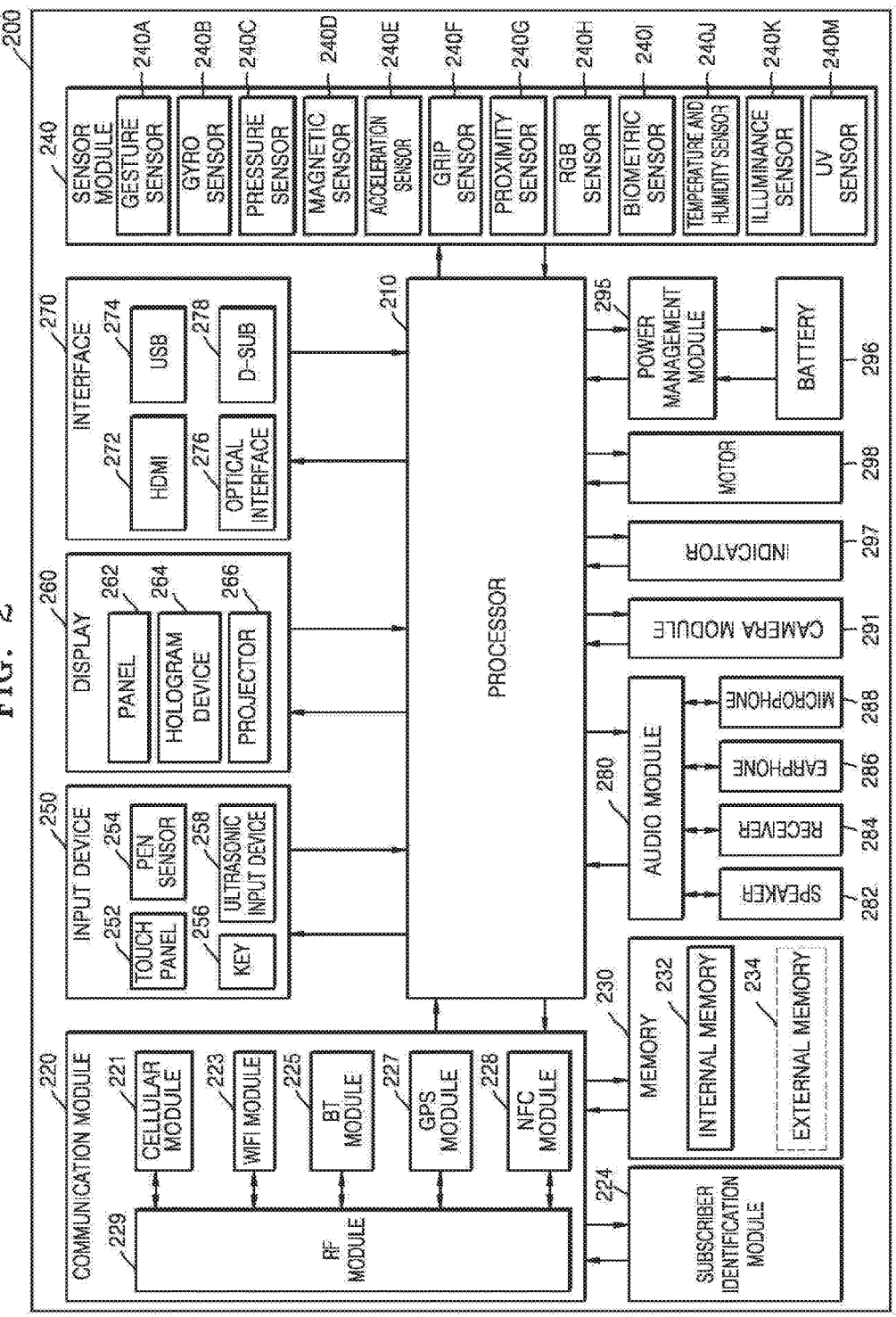
FIG. 2 is a schematic block diagram of a terminal device according to an exemplary embodiment.

FIG. 2 is a schematic block diagram of a terminal device according to an exemplary embodiment.

Referring to FIG. 2, a terminal device 200 may include one or more application processors (APs) 210, a communication module 220, a subscriber identification module (SIM) card 224, a memory 230, a sensor module 240, an input device 250, a display 260, an interface 270, an audio module 280, a camera module 291, an indicator 297, a motor 298, a power management module 295, and a battery 296.

The AP 210 may run an operating system or an application program to control multiple hardware or software elements connected to the AP 210, and may perform processing and operations of various types of data including multimedia data. The AP 210 may be implemented, for example, as a system-on-chip (SoC). According to an exemplary embodiment, the AP 210 may further include a graphics processing unit (GPU). The AP 210 may be an example of the controller 110.

The communication module 220 may transmit and receive data through communication between the terminal device 200 and other electronic devices connected over a network. According to an embodiment, the communication module 220 may include a cellular module 221, a Wi-Fi module 223, a Bluetooth (BT) module 225, a global positioning system (GPS) module 227, a near-field communication (NFC) module 228, and a radio frequency (RF) module 229.

According to an exemplary embodiment, at least one of the Wi-Fi module 223, the BT module 225, and the NFC module 228 may communicate with an external terminal device or an external control device to receive a privacy switch-on instruction and information regarding content to be shown or hidden at the display 260.

The cellular module 221 may provide a voice call, a video call, a message service, or an Internet service through a communication network (e.g., Long-Term Evolution (LTE), LTE-Advanced (LTE-A), Code Division Multiple Access (CDMA), Wideband Code Division Multiple Access (WCDMA), Universal Mobile Telecommunications Service (UMTS), Wireless Broadband (WiBro), or Global System for Mobile communication (GSM)). Also, the cellular module 221 may identify and authenticate a terminal device in a communication network by, for example, using a SIM (e.g., the SIM card 224).

According to an exemplary embodiment, the AP 210 or the cellular module 221 (e.g., a communication processor) may load instructions or data received from a non-volatile memory and/or other components connected thereto to a volatile memory and process the loaded instructions or data.

For example, each of the Wi-Fi module 223, the BT module 225, the GPS module 227, and the NFC module 228 may include a processor for processing data transmitted or received through the corresponding module. According to an exemplary embodiment, at least some (e.g., two or more) of the cellular module 221, the Wi-Fi module 223, the BT module 225, the GPS module 227, and the NFC module 228 may be included in a single integrated chip (IC) or an IC package.

The RF module 229 may transmit and receive data (e.g., RF signals). The RF module 229 may include, for example, a transceiver, a power amp module (PAM), a frequency filter, a low noise amplifier (LNA), and the like. According to an exemplary embodiment, at least one of the cellular module 221, the Wi-Fi module 223, the BT module 225, the GPS module 227, and the NFC module 228 may transmit and receive an RF signal through a separate RF module.

The SIM card 224 may be a card including a SIM, and may be inserted into a slot that is formed at a specific position of the terminal device. The SIM card 224 may include unique identification information (e.g., integrated circuit card identifier (ICCID) or subscriber information such as an international mobile subscriber identity (MI)).

The memory 230 may include an internal memory 232 or an external memory 234. The internal memory 232 may include, for example, volatile memories (e.g., a dynamic random access memory (DRAM), a static RAM (SRAM), or a synchronous dynamic RAM (SDRAM)) and/or non-volatile memories (e.g., a one-time programmable read only memory (OTPROM), a programmable ROM (PROM), an erasable and programmable ROM (EPROM), an electrically erasable and programmable ROM (EEPROM), a mask ROM, a flash ROM, a NAND flash memory, or a NOR flash memory).

According to an exemplary embodiment, the internal memory 232 may be a solid-state drive (SSD). The external memory 234 may further include a flash drive, for example, a compact flash (CF), a secure digital (SD), a micro SD, a mini SD, an extreme digital (xD), or a memory stick. The external memory 234 may be functionally connected to the terminal device 200 through various interfaces. (200)

The sensor module 240 may measure a physical quantity or detect an operating state of the terminal device 200 and convert the measured or detected information into electrical signals. The sensor module 240 may include, for example, a gesture sensor 240A, a gyro sensor 240B, an atmospheric pressure sensor 240C, a magnetic sensor 240D, an acceleration sensor 240E, a grip sensor 240F, a proximity sensor 240G, a color sensor 240H (e.g., a red, green, and blue (RGB) sensor), a biometric sensor 240I, a temperature/humidity sensor 240J, an illuminance sensor 240K, and an ultraviolet (UV) sensor 240M. Additionally or alternatively, the sensor module 240 may include, for example, an E-nose sensor, an electromyography (EMG) sensor, an electroencephalogram (EEG) sensor, an electrocardiogram (ECG) sensor, an infrared (IR) sensor, an iris sensor, or a fingerprint sensor. The sensor module 240 may further include a control circuit for controlling the at least one sensor included therein.

The input device 250 may include a touch panel 252, a (digital) pen sensor 254, a key 256, and/or an ultrasonic input device 258. For example, the touch panel 252 may recognize a touch input of at least one of the following types: a capacitive type, a resistive type, an infrared type, and an ultrasonic type. Also, the touch panel 252 may further include a control circuit. In case of the capacitive type, a physical contact or proximity may be recognized. The touch panel 252 may further include a tactile layer. In this case, the touch panel 252 may provide tactile feedback to a user.

For example, the (digital) pen sensor 254 may be formed in a similar or the same way as receiving a touch input of a user or by using a separate recognition sheet. The key 256 may include, for example, a physical button, an optical key, or a keypad. The ultrasonic input device 258 is a device capable of checking data by detecting sound waves with a microphone (e.g., a microphone 288) in the terminal device 200 through an input tool that generates ultrasonic signals, and thus may perform wireless recognition. According to an exemplary embodiment, the terminal device 200 may receive a user input from an external device (e.g., a computer or a server) connected thereto through the communication module 220.

According to an exemplary embodiment, the terminal device 200 may receive the privacy switch-on (i.e., activation) instruction or a designation of content to be hidden or shown by using at least one of the touch panel 252, the (digital) pen sensor 254, the key 256, and the ultrasonic input device 258 included in the input device 250.

The display 260 may include a panel 262. The panel 262 may be, for example, a liquid-crystal display (LCD), an active-matrix organic light-emitting diode (AMOLED), or the like. The panel may be implemented to be, for example, flexible, transparent, or wearable. Alternatively, the panel 262 and the touch panel 252 may be formed as a single module. The display 260 may also include a hologram device 264 for simulating a projection of a three-dimensional image and/or a projector 266 for projecting an image onto a flat surface.

The interface 270 may include, for example, a High-Definition Multimedia Interface (HDMI) 272, a Universal Serial Bus (USB) 274, an optical interface 276, or a D-sub-miniature (D-sub) 278. The interface 270 may be included in, for example, the communication module 130 shown in FIG. 1. The audio module 280 may bi-directionally convert a sound and an electrical signal. The audio module 280 may process sound information that is input or output through, for example, a speaker 282, a receiver 284, an earphone 286, or the microphone 288.

The camera module 291 may be a device for capturing a still or moving image. According to an exemplary embodiment, the camera module 291 may include at least one image sensor (e.g., a front sensor or a rear sensor), a lens, an image signal processor (ISP), and/or a flash (e.g., an light-emitting diode (LED) or a xenon lamp).

The power management module 295 may manage power of the terminal device 200. The power management module 295 may include, for example, a power management IC (PMIC), a charger IC, or a battery or fuel gauge.

The indicator 297 may indicate a specific state of the terminal device 200 or a component thereof (e.g., the AP 210), for example, a booting state, a message state, or a charging state. The motor 298 may convert an electrical signal into mechanical vibration.

According to an exemplary embodiment, the terminal device 200 may inform a user that the terminal device 200 has been switched to the privacy mode through at least one of the indicator 297, the motor 298, and the audio module 280.

The above-described elements of the terminal device according to various exemplary embodiments may each include one or more components, and the name of a corresponding element may vary depending on the type of the terminal device. The terminal device according to various exemplary embodiments may include at least one of the aforementioned elements, and may exclude some elements or further include other additional elements. Because some of the elements of the terminal device according to various exemplary embodiments are combined into one entity, functions of the elements may be performed in the same way as before the combination. The various modules, devices, and interfaces shown in FIG. 2 may be implemented with hardware, software, or a combination thereof.

Figure 3:
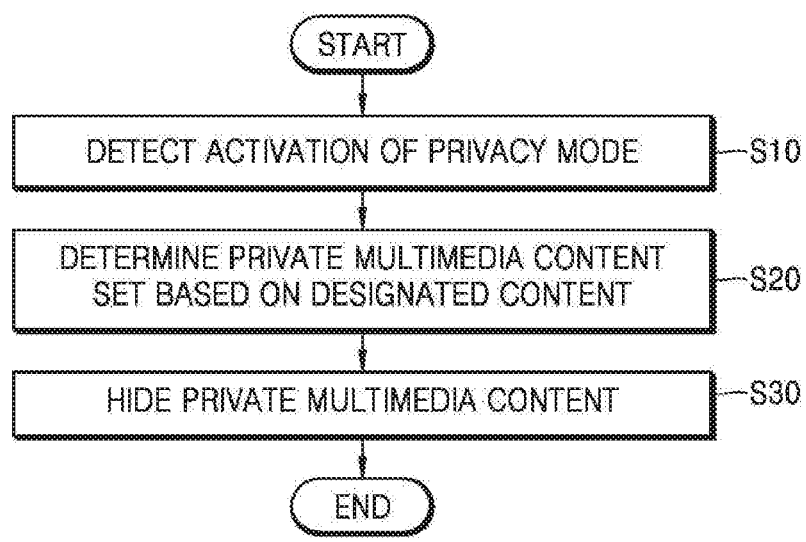
FIG. 3 is a flowchart showing a privacy protection method of a terminal device according to an exemplary embodiment.

FIG. 3 is a flowchart showing a privacy protection method of the terminal device 100 according to an exemplary embodiment.

In operation S10 of FIG. 3, the terminal device may detect activation of the privacy mode.

In operation S20, the terminal device may determine a private multimedia content set on the basis of designated multimedia content.

In operation S30, the terminal device may hide the private multimedia content set.

Figure 4:
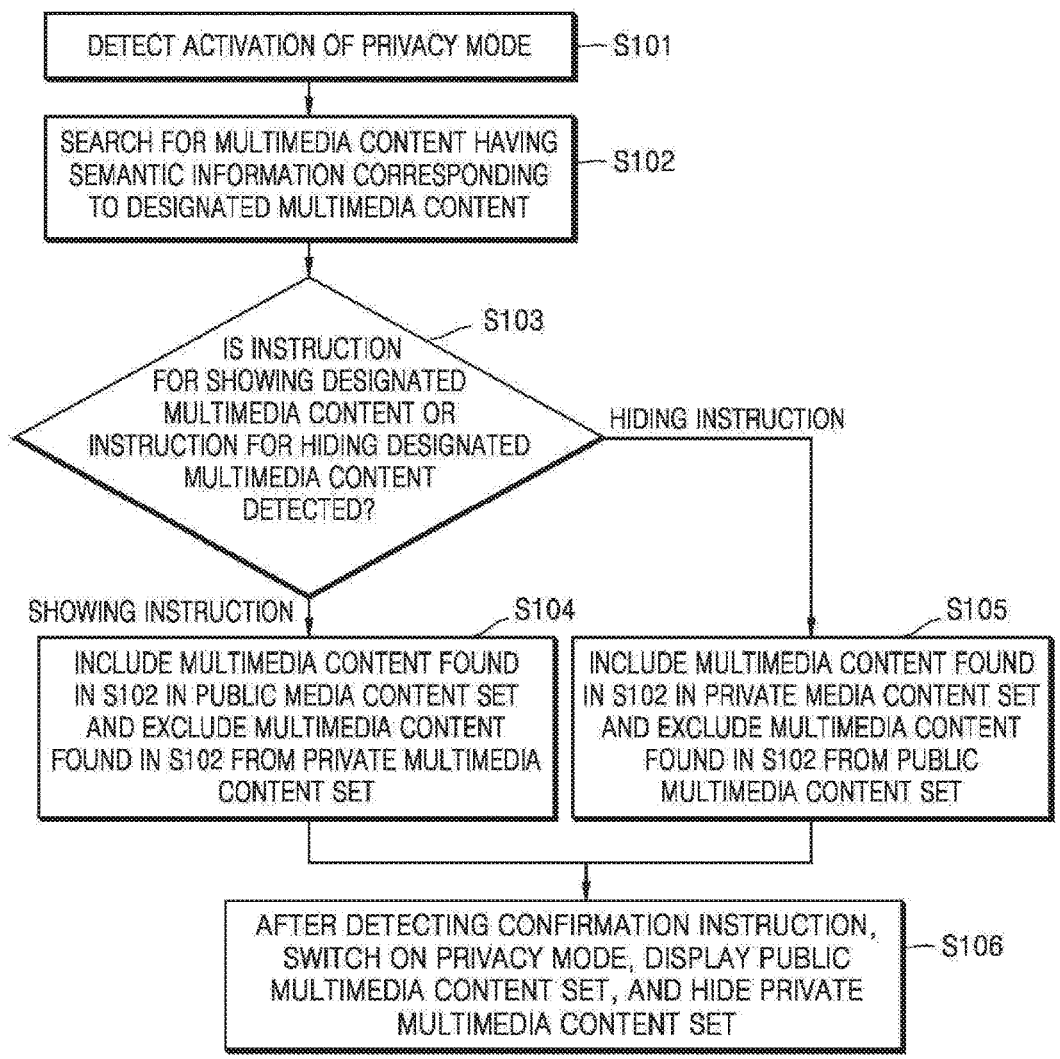
FIG. 4 is a flowchart showing a privacy protection method according to an exemplary embodiment.

FIG. 4 is a flowchart of a privacy protection method according to an exemplary embodiment.

In operation S101, a privacy mode activation instruction is detected.

In operation S102, multimedia content having semantic information corresponding to designated multimedia content is searched for. The multimedia content having semantic information corresponding to designated multimedia content may include the multimedia content having the same or similar semantic information with the designated multimedia content.

The terminal device may first obtain the designated multimedia content. If the user has designated a multimedia file and/or a portion of a multimedia file, the designated multimedia content may include the multimedia content in the designated multimedia file and/or the designated portion of the designated multimedia file.

For example, if the user designates an image in a photo album via a long-press (i.e., tap and hold), the image may become a designated multimedia file, and the content of the image may become the multimedia content contained in the designated multimedia file. Alternatively, the user may designate a portion of the image depicting user B (e.g., the image may include a portion containing user B and a portion containing user C) in the album via a long-press, and the portion of the image containing user B may become the designated content in the designated multimedia file.

In some exemplary embodiments, a plurality of multimedia content may be designated (i.e., the user may designate several multimedia files, or designate several portions of the designated multimedia file). In other words, there may be several designated multimedia files, and there may also be a plurality of designated portions in the designated multimedia file.

Figure 5:
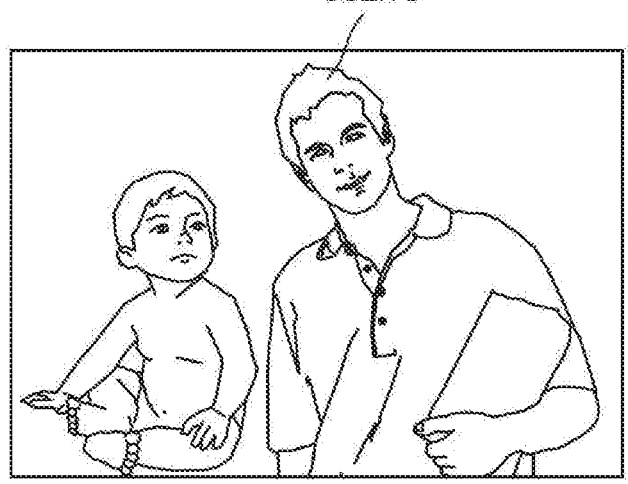
FIG. 5 is a reference diagram illustrating designation of multimedia content.

For example, as shown in FIG. 5, image A may be the designated multimedia file. The terminal device searches the stored multimedia content for those having the same semantic information with image A. Alternatively, a portion of image A that contains user B may be designated the designated content in the designated multimedia file, the terminal device may search the stored multimedia content for those having the same semantic information with the portion of image A containing user B.

In some exemplary embodiments, the user may first designate the multimedia content and then issue the privacy mode activation instruction; issue the privacy mode activation instruction before designating the multimedia content; or designate the multimedia content and issue the privacy mode activation instruction simultaneously.

In operation S102 of FIG. 4, via techniques such as image recognition, text recognition and/or image classification, the terminal device may identify the multimedia content that shares the same or similar semantic information with the designated multimedia content. The semantic information may include an object, a number of objects (i.e., how many objects are there in an image), a status of an object (e.g., whether the object is moving or stationary), a scene, and an event depicted in an image.

For example, user A designates an image which only includes user B. Thus, the image having the same semantic information with this image may also include user B only. Alternatively, user A may designate an image which only includes user B and user B is depicted as moving. Thus, the image having the same semantic information with this image may also include user B only and user B is moving.

In operation S103, it is determined whether an instruction for showing the designated multimedia content or an instruction for hiding the designated multimedia content is detected. If the instruction for showing the designated multimedia content is detected, operation S104 is executed; and if the instruction for hiding the designated multimedia content is detected, operation S105 is executed.

In operation S104, the multimedia content found in operation S102 may be included in the public media content set but excluded from the private multimedia content set.

In some exemplary embodiments, after detecting the privacy mode activation instruction of the user, the terminal device may first enter into a privacy protection pre-configuration mode to configure the private multimedia content set and the public multimedia content set in a privacy protection pre-configuration interface. After finishing the configuration, the user may confirm to switch on the privacy mode via any one or any combination of: voice, button, gesture, biometric feature, augmented reality man-machine interactive interface and external controller. After receiving a confirmation instruction, the terminal device switches from the privacy protection pre-configuration mode to the privacy mode and hides the private multimedia content set.

In operation S104, the terminal device may further detect whether the public multimedia content set includes multimedia content containing designated private information. If yes, the multimedia content is removed from the public multimedia content set and is displayed in a lower displaying position in the privacy protection pre-configuration interface. The designated private information may be at least one of the following privacy-relevant content: personal identity information, personal account information, financial information, banking or credit card information, etc. The designated private information may be configured by system in advance or may be designated by the user in advance. For example, the user may configure in advance to protect personal identity information and personal account information during privacy protection. Subsequently, during the privacy protection, the terminal device may provide privacy protection to the multimedia content containing the personal identity information and the personal account information. In addition, the designated private information may also be designated in real time by the user when the privacy protection is switched on or during the privacy protection procedure.

In addition, when configuring the designated multimedia content in the privacy protection pre-configuration interface, multiple times of configurations may be required. In order to facilitate the user to configure the designated multimedia content for a second time, it is provided in the exemplary embodiments that, during the configuration by the user, the terminal device may display the multimedia content which has been determined as viewable in an integrated manner in the privacy protection pre-configuration interface. In particular, the viewable multimedia content may be displayed on the same image position and is marked as viewable. At last, all of the viewable multimedia content may be displayed on few image positions in the integrated manner. As such, the user is able to rapidly view the remaining multimedia content and designate the multimedia content again.

In addition, the remaining multimedia content may be displayed after being sorted following a predefined sorting rule and may be marked as hidden. The predefined sorting rule may include sorting according to at least one of: similarity with the viewable multimedia content, corresponding subject, corresponding object, and contained private information. For example, it is possible to display the remaining multimedia content according to their similarity with respect to the viewable multimedia content in a descending order, wherein the multimedia content which does not contain private information is displayed preferably, and the multimedia content containing private information is displayed in lower positions.

In addition, before displaying the sorted remaining multimedia content, it is possible to search the remaining multimedia content for those having similarity with respect to the viewable multimedia content, and display the discovered multimedia content in the integrated manner, or select and preferably display a predefined number of the found multimedia content. Through the above, during the configuration procedure by the user, the content having been identified may be displayed in the integrated manner, and the content not having been identified may be displayed respectively, so as to facilitate the user to rapidly configure the designated multimedia content, which shortens the time for switching on and configuring the privacy protection.

Figure 6:
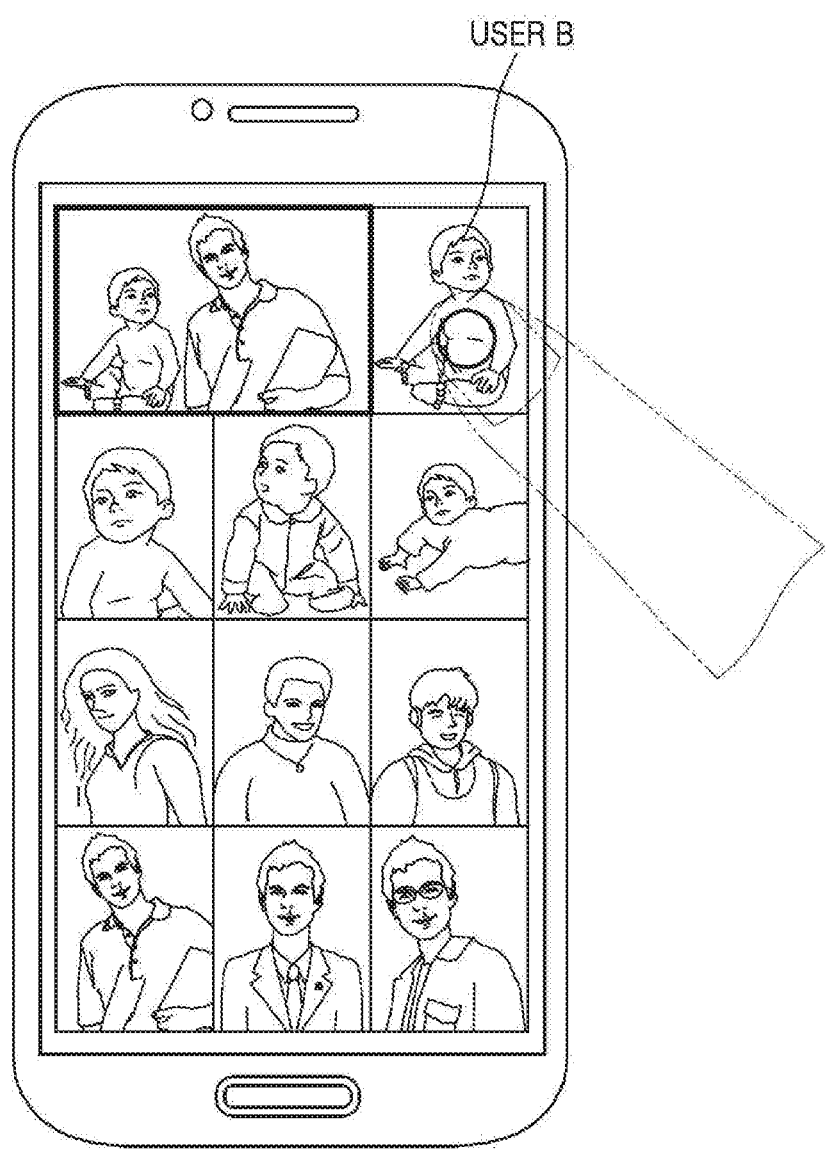
FIG. 6 is a diagram showing an operation in which user A shows an image of user B according to an exemplary embodiment.
Figure 7:
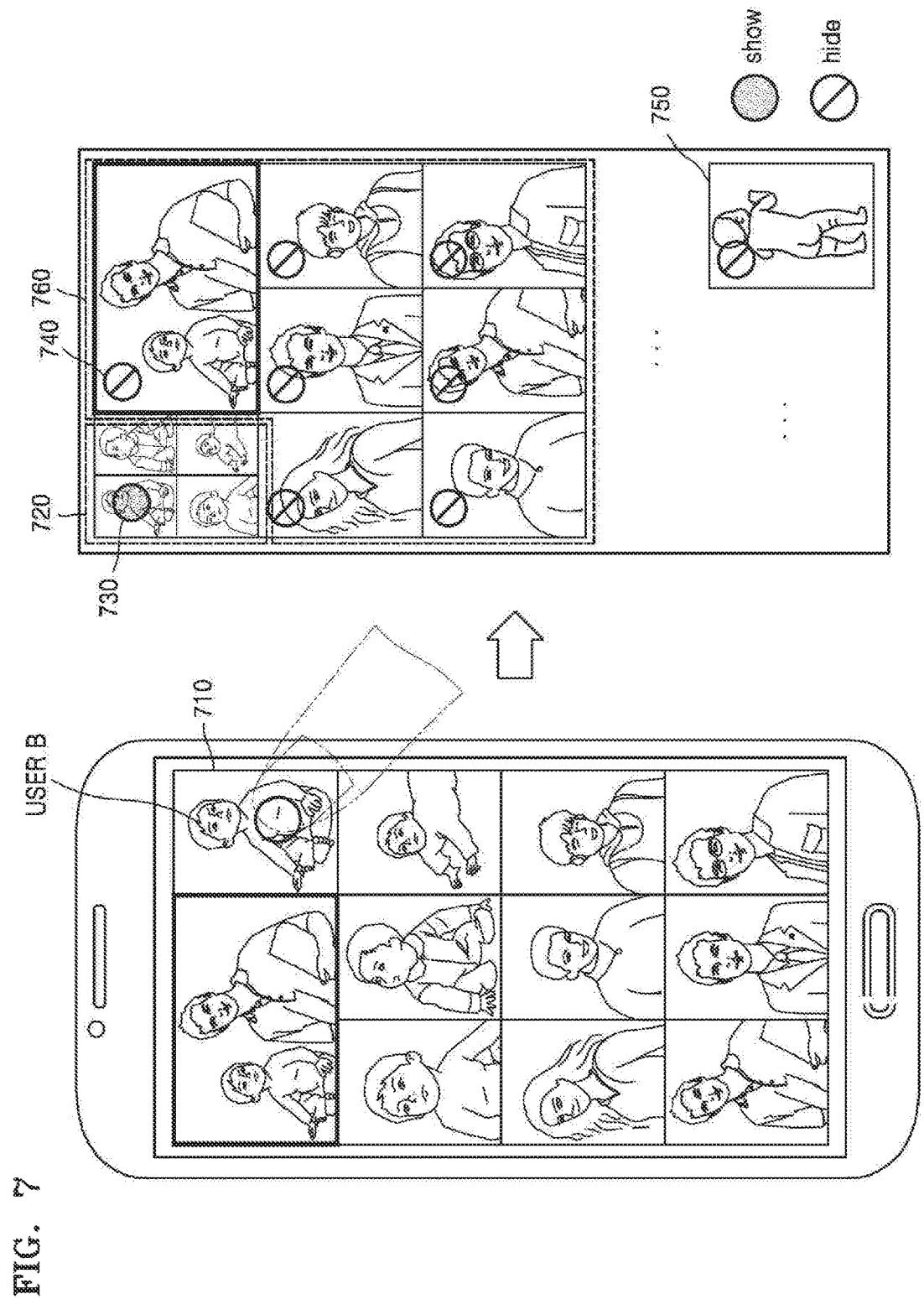
FIG. 7 is a reference diagram illustrating an example in which a private image is removed from a public multimedia content set according to an exemplary embodiment.

For example, as shown in FIG. 6, user A may want to show an image of user B to his or her friend. In this case, user A may simply select an image containing user B and show the selected multimedia content. A terminal device may find all images containing user B on the basis of the image designated by user A, and then may determine that a multimedia content set to be shown should include images containing only user B. The terminal device determines whether the multimedia content set to be shown includes images containing private images. Accordingly, images containing private images of user B are detected. Accordingly, as shown in FIG. 7, the terminal device may remove private images from the multimedia content set to be shown, which includes the images containing user B, and private images 750 are displayed at a lower portion of a privacy protection pre-configuration interface. The terminal device integrates thumbnails of images containing only user B 710 in the multimedia content set to be shown, displays integrated images 720 at a first image position, and marks (730) images to be shown. The other images that are not marked to be shown may be marked (740) to be hidden. Also, images to be shown may be displayed in an integrated manner (e.g., as composite images), and images to be hidden 760 may be displayed individually rather than in an integrated manner. The terminal device may further classify the remaining images in descending order according to correlations with images to be shown in which only user B is displayed. For example, group images of user B and other people are recorded first, and images including other people in the group images are recorded at an upper position. At the same time, for multimedia content determined to be hidden, one or more pieces of representative multimedia content may be selected from different types of multimedia content. For example, the representative multimedia content may be displayed at a front side. The type of multimedia content may be classified according to a scene, an object, etc.

An order in which multimedia content will be shown in the privacy protection pre-configuration interface may also be changed. That is, after finding multimedia content to be shown according to multimedia content designated by a user, the terminal device marks the multimedia content without changing the original displaying order thereof. This method may enable images marked as hidden to be precisely previewed without changing their displaying order and also facilitate the user's adjustment based on the original displaying order thereof.

Also, a displaying order of only some multimedia content may be adjusted. For example, a displaying order of only multimedia content to be shown may be adjusted while a displaying order of the other multimedia content may not be changed. Also, for example, the displaying order of only the other multimedia content may be changed while the displaying order of the multimedia content to be shown may not be changed.

In operation S105 of FIG. 4, when the terminal device detects an instruction for hiding the designated multimedia content in operation S103, the terminal device may include the multimedia content found in operation S102 in the private multimedia content set but exclude the multimedia content found in operation S102 from the public multimedia content set.

When the designated multimedia content is set in the privacy protection pre-configuration interface, multiple settings may be needed. In operation S105, the terminal device may display private multimedia content in the privacy protection pre-configuration interface in an integrated manner so that the user may easily set the designated multimedia content again. In particular, the private multimedia content may be displayed at one or more positions of a screen of the terminal device as bundles, and may be displayed as hidden content. Accordingly, all of the private multimedia content may be displayed at some image positions in an integrated manner. Thus, the user may quickly view the remaining multimedia content and designate multimedia content again. Also, the other multimedia content may be displayed after being classified according to a predetermined classification rule and may be displayed to be shown. The predetermined classification rule may include a correlation with the private multimedia content, a corresponding subject, a corresponding object, and/or private information contained therein as a classification item.

Also, before displaying the other classified multimedia content, the terminal device may search for and find multimedia content having the same correlation as the private multimedia content and display the found multimedia content in an integrated manner or display the number of pieces of the found multimedia content.

Accordingly, determined content may be displayed in an integrated manner and undetermined content may be displayed individually so that the user may quickly set the designated multimedia content while setting the content. As shown in FIG. 7, reference number 720 indicates that content may be displayed in an integrated manner, and reference number 760 indicates that content may be displayed individually.

In addition, the displaying order of the viewable multimedia content in the privacy protection pre-configuration interface may also be not changed. In other words, after finding the private multimedia content according to the designated multimedia content configured by the user, the terminal device marks the multimedia content without changing their original displaying order. This approach has an advantage of allowing the user to have a clear preview of which images are marked as hidden without changing the displaying order, which facilitate the user to make adjustments based on the original displaying order.

It is also possible to adjust the displaying order of only some multimedia content. For example, it is possible to adjust the displaying order of only the private multimedia content and maintain the displaying order of other multimedia content unchanged. For another example, it is possible to change the displaying order of only the other multimedia content and maintain the displaying order of the private multimedia content unchanged.

Through operations S102-S105 of FIG. 4, the private multimedia content set and the public multimedia content set are determined based on the designated multimedia content configured by the user.

In operation S106, after a confirmation instruction is detected, the privacy mode is switched on, the public multimedia content set is displayed and the private multimedia content set is hidden.

If the designated multimedia content is an image and/or a part of an image, the terminal device analyzes the semantic information such as object, number of objects, scene and event of the designated multimedia content via techniques such as image classification and image recognition, to find in a multimedia library an image, a part of an image, a video, a video segment, a video image frame, a part of a video image frame, an audio, or an audio segment having the same or similar semantic information as the designated multimedia content. After the privacy mode is switched on, when a video is played, only the viewable multimedia content is played, and other private multimedia content is skipped. If a video image frame which is selected as the cover of the video that is designated private, on the user interface of the terminal device, the cover of the video is replaced by a first video image frame designated public.

If the designated multimedia content is at least one of: a video, a video segment, a video image frame, and a part of a video image frame, the user may designate the whole video file, a segment of the video file (consisting of multiple continuous video image frames), one or more video image frames of the video file, or a part of the video image frame. The terminal device analyzes the semantic information such as object, number of objects, scene and event of the designated multimedia content via techniques such as image classification and image recognition algorithm, to find an image, a part of an image, a video, a video segment, a video image frame, a part of a video image frame, an audio or an audio segment having the same or similar semantic information as the designated multimedia content in the multimedia library.

If the designated multimedia content is an audio and/or an audio segment, the semantic information of the designated audio and/or the audio segment is retrieved through techniques such as voice recognition and semantic recognition. According to the semantic information, the multimedia library is searched for an image, a part of an image, a video, a video segment, a video image frame, a part of a video image frame, an audio or an audio segment having the same or similar semantic information as the designated audio and/or audio segment.

In some exemplary embodiments, after receiving the privacy mode activation instruction from the user, the terminal device enters into the privacy protection pre-configuration mode. If the terminal device detects the instruction for showing the designated multimedia content, the terminal device determines that the viewable multimedia content set includes the multimedia content found in operation S102 and the private multimedia content set does not include the multimedia content found in operation S102, and marks the public multimedia content in the privacy protection pre-configuration interface as public and marks the private multimedia content as hidden. If the terminal device detects an instruction for hiding the designated multimedia content, the terminal device includes the multimedia content found in operation S102 in the private multimedia content set and excludes the multimedia content found in operation S102 from the public multimedia content set, and marks in the privacy protection pre-configuration interface the private multimedia content as hidden and marks the public multimedia content as viewable. Finally, after receiving a confirmation instruction, the terminal device enters the privacy mode, displays the multimedia content marked as public and hides the multimedia content marked as private.

Alternatively, after receiving the privacy mode activation instruction from the user, the terminal device does not enter into the privacy protection pre-configuration mode. After receiving an instruction for showing the designated multimedia content, the terminal device includes the multimedia content found in operation S102 in the public multimedia content set and excludes the multimedia content found in operation S102 from the private multimedia content set. After receiving an instruction for hiding the designated multimedia content, the terminal device includes the multimedia content found in operation S102 in the private multimedia content set and excludes the multimedia content found in operation S102 from the public multimedia content set. At last, after receiving a confirmation instruction, the terminal device enters into the privacy mode, displays the public multimedia content and hides the private multimedia content.

The user may provide an instruction for showing the designated multimedia content while switching on the privacy mode. The terminal device may detect an instruction for switching on the privacy mode and an instruction for showing the designated multimedia content at the same time. Also, the user may provide an instruction for hiding the designated multimedia content while switching on the privacy mode. The terminal device may detect the instruction for switching on the privacy mode and an instruction for hiding the designated multimedia content at the same time.

According to an exemplary embodiment, user A desires to show an image of user B included in the terminal device to his or her friend. Also, private images that should not be revealed to his or her friend are stored in the terminal device.

Figure 8:
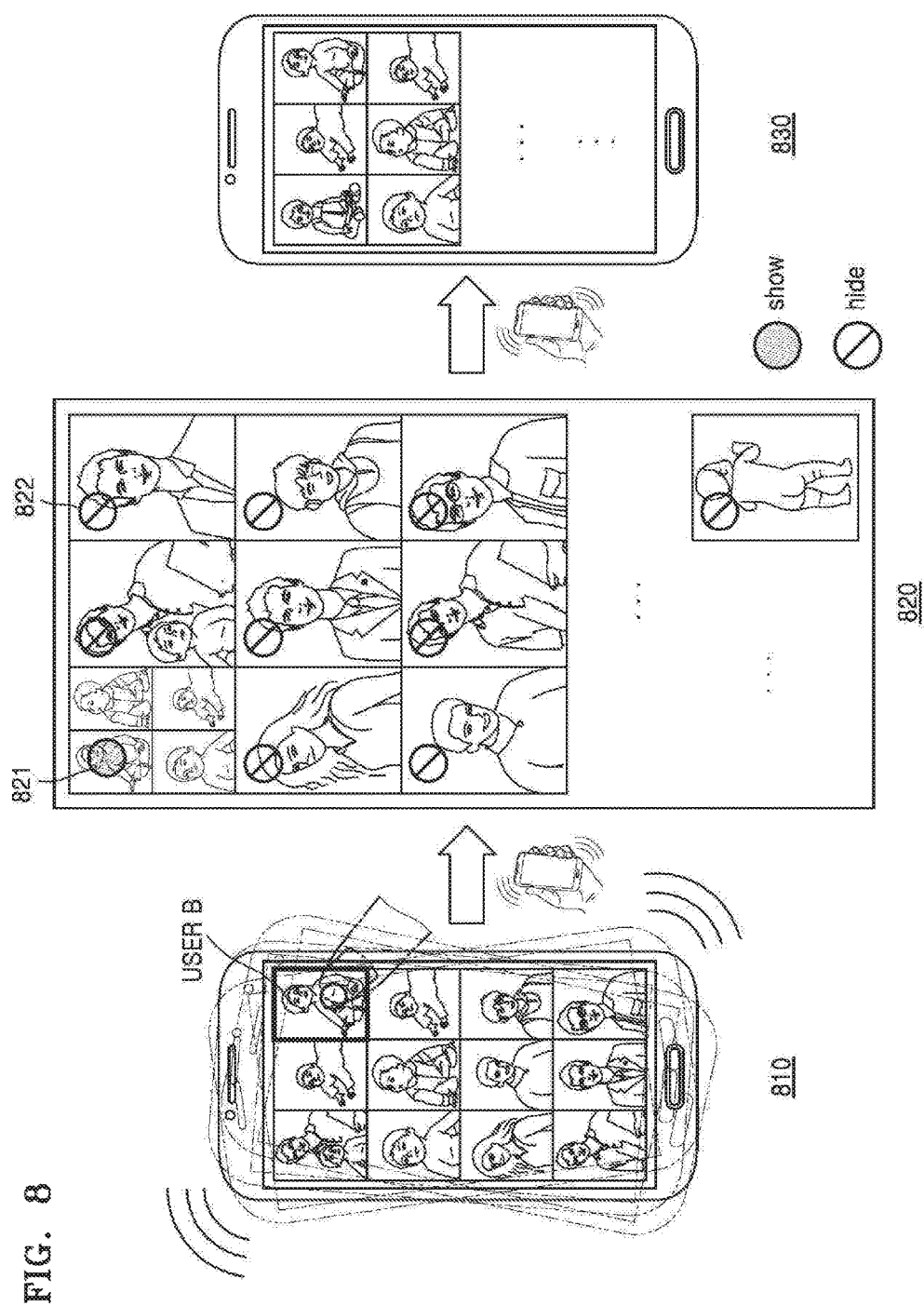
FIG. 8 shows an example of a method of displaying multimedia content when a privacy mode is switched on according to an exemplary embodiment.

FIG. 8 shows an example of a method of displaying multimedia content when a privacy mode is switched on according to an exemplary embodiment.

As an example, a user starts an image preview mode, long presses an image of user B, and shakes the terminal device up and down (810). By shaking the terminal device up and down, the user issues a command for the terminal device to switch on the privacy mode, show designated multimedia content, and enter a privacy protection pre-configuration mode 820. By receiving a user's selection of the image of user B, the terminal device may designate all individual images that include user B as public multimedia content. The terminal device displays public images in the privacy protection pre-configuration interface as marked "show" (821) and displays the remaining images as marked "hide" (822). The user shakes the terminal device again to confirm the choices. When the confirmation instruction is generated, the terminal device switches on the privacy mode and only displays the public images. As a result, the friend may view only the images to be shown in association with user B.

Figure 9:
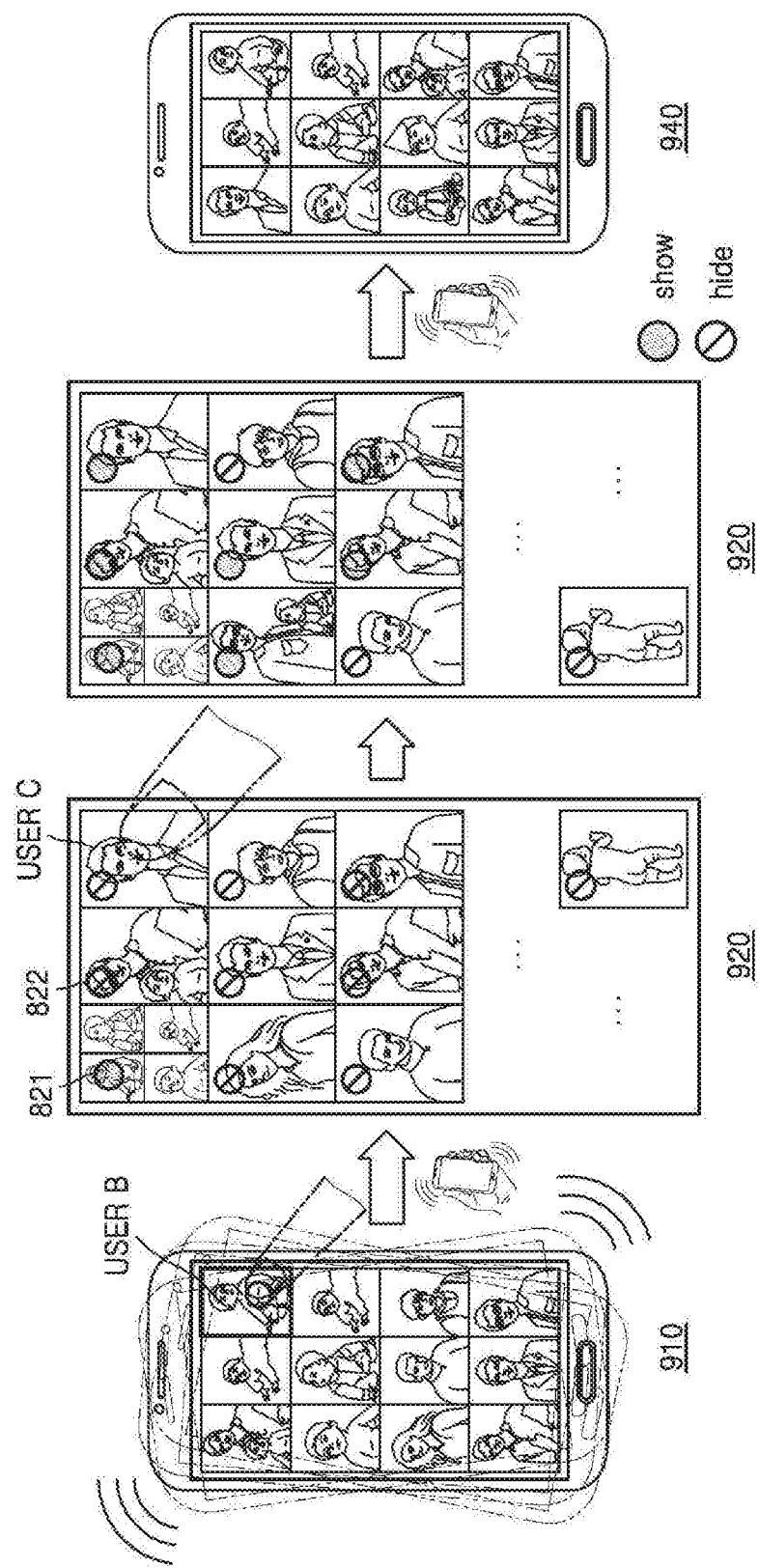
FIG. 9 is a reference diagram illustrating an operation of a terminal device where a user whose images will be shown is selected twice when a privacy mode is switched on according to an embodiment.

FIG. 9 is a diagram illustrating an operation of a terminal device where a user whose images will be shown is selected twice when a privacy mode is switched on according to an exemplary embodiment.

In this example, a user starts an image preview mode, long presses an image of user B, and shakes the terminal device up and down (910). By shaking the terminal device up and down, the user sends to the terminal device an instruction for switching on the privacy mode, showing designated multimedia content, and entering a privacy protection pre-configuration mode 920. When the user presses the image of user B, the terminal device may designate all individual images that includes user B as public multimedia content. The terminal device displays public images in the privacy protection pre-configuration interface as marked "show" (821) and displays the remaining images as marked "hide" (822). In this case, the user may designate multimedia content again in the privacy protection pre-configuration interface. That is, the user may press an image of user C on a screen of the privacy protection pre-configuration mode 920. By the user's selection of user C, the terminal device may designate the images that include user C as public multimedia content. Accordingly, the terminal device may output a screen on which the images that include user C are additionally marked "show" (821) (930). The user shakes the terminal device again to generate the confirmation instruction. When the confirmation instruction is generated, the terminal device switches on the privacy mode and only displays the public images (940). As a result, a friend may view only the images to be shown in association with user B, the images to be shown in associated with user C, and images including both user B and user C.

In another example, the user starts an image preview mode and finds that some images contain a private scene. The user does not want these images be seen by her friend. The user long presses an image containing the private scene and shakes the terminal device left and right. The terminal device receives a privacy mode activation instruction, an instruction for hiding designated multimedia content is generated by shaking the terminal device left and right, and the terminal device enters the privacy protection pre-configuration mode. According to the image containing the private scene designated by the user by the long-press, the terminal device designates private multimedia content set (e.g., the images containing the designated private scene), and marks these images as hidden in the privacy protection pre-configuration interface, and marks other images as viewable. The user shakes the terminal device again to generate a confirmation instruction. The terminal device switches on the privacy mode and only displays the public multimedia content. Thereafter, after the user gives the terminal device to the friend, the friend cannot see all the images containing the private scene.

In the exemplary embodiments, instructions such as the privacy mode activation instruction, the instruction for showing the designated multimedia content, the instruction for hiding the designated multimedia content, and the confirmation instruction, may be generated by any one or any combination of the following: a voice, a button, a gesture, a shake, a biometric feature, an augmented reality interface, and an external controller.

FIG. 10A is a diagram showing an example of generating a privacy-mode-related instruction with a voice according to an exemplary embodiment.

As shown in FIG. 10A, a user may map voice commands to instructions. For example, the phrase "show images" may correspond to an instruction for designating the selected images as public, the phrase "hide images" may correspond to an instruction for designating the selected multimedia content as private, and the phrase "confirm selections" may corresponding to a confirmation instruction. When a voice command is recognized, the terminal device performs an operation corresponding to the voice command. Also, a voice command may correspond to multiple instructions. For example, "show images" may correspond to the instruction for switching on the privacy mode and the instruction for showing designated multimedia content.

FIG. 10B is a diagram showing an example of generating a privacy-mode-related instruction with a button according to an exemplary embodiment.

As shown in FIG. 10B, an instruction 1000 may be mapped to one or more combinations of a button type 1001, a button pressing time 1002, a button pressing pressure 1003, and the like. The button type 1001 may indicate whether the button is a physical button or a virtual button. The button pressing time 1002 may indicate whether a time that the button is pressed is long or short (e.g., compared to a threshold time duration). The button pressing pressure 1003 may indicate whether pressure on the button is strong or weak (e.g., compared to a threshold button pressure).

The button may be a physical button and different physical buttons may correspond to different instructions. For example, a long-press on a volume button or a home button may correspond to the privacy mode activation instruction. The user may generate the privacy mode activation instruction by long pressing the volume button or the home button. The button may also be a virtual button (e.g., a virtual controller button or a menu displayed on the screen). The terminal may display the virtual button in a multimedia content preview interface. The user may generate different instructions by pressing different virtual buttons. In addition, different combinations of multiple kinds of characteristic information such as pressing pressure, pressing speed and pressing time of the user may have different meanings. For example, a light press may correspond to the instruction for showing the designated multimedia content. A heavy press may correspond to the instruction for hiding the designated multimedia content. For another example, a long press may correspond to the instruction for showing the designated multimedia content. A double click may correspond to the instruction for hiding the designated multimedia content, and so on. In addition, one press may correspond to multiple instructions (e.g., the heavy press may correspond to the privacy mode switching-on instruction and the instruction for hiding the designated multimedia content).

FIG. 10C is a diagram showing an example of generating a privacy-mode-related instruction with a gesture according to an exemplary embodiment.

As shown in FIG. 10C, an instruction 1000 may be assigned to one or more combinations of a gesture type 1011, a screen gesture speed 1012, a screen gesture duration time 1013, a screen gesture pressure 1014, and the like. The gesture type 1011 may include, for example, double-clicking, long-pressing, up-and-down shaking, left-and-right shaking, tilting, etc. The gesture speed 1012 may include a high speed or a low speed (e.g., compared to a threshold speed). The gesture duration time 1013 may include a long time or a short time (e.g., compared to a threshold time duration). The gesture pressure 1014 may include a strong pressure or a weak pressure (e.g., compared to a threshold pressure).

The gesture may include a screen gesture (e.g., double clicking the screen, long pressing the screen, etc.). The gesture may have different meanings when combined with different kinds of characteristic information such as gesture pressure, gesture speed, and gesture time. For example, a light press may correspond to the instruction for showing the designated multimedia content. A heavy press may correspond to the instruction for hiding the designated multimedia content. For another example, a long press may correspond to the instruction for showing the designated multimedia content, and a double click may correspond to the instruction for hiding the designated multimedia content, and so on. The gesture may also be an air gesture such as shaking the terminal, turning the terminal over, inclining the terminal. Different directions, angles, speeds, durations and/or strengths of the shaking, turning and inclining operations may have different meanings. For example, an up-down shake may correspond to the instruction for showing the designated multimedia content. A left-right shake may correspond to the instruction for hiding the designated multimedia content. For another example, a left-incline may correspond to a displaying instruction, and a right-incline may correspond to the instruction for hiding the designated multimedia content. The above gesture may be a single gesture or a combination of various gestures. For example, a combination of a long-press on the screen and shaking of the terminal may correspond to the instruction for showing the designated multimedia content. A combination of a long-press on the screen and turning-over of the terminal may correspond to the instruction for hiding the designated multimedia content. In addition, one gesture may also correspond to multiple instructions. For example, the left-right shaking may correspond to the privacy mode activation instruction and the instruction for hiding the designated multimedia content.

The biometric feature may be a handwriting feature, a fingerprint feature, or a voiceprint feature. In the multimedia content preview mode, if the terminal device determines that the detected biometric feature is consistent with a pre-registered biometric feature of the user, it determines that the privacy mode activation instruction is received. At this time, the user may generate the instruction for showing the designated multimedia content, the instruction for hiding the designated multimedia content, or the confirmation instruction by any one or any combination of voice, button, gesture, and external controller.

Figure 10D:
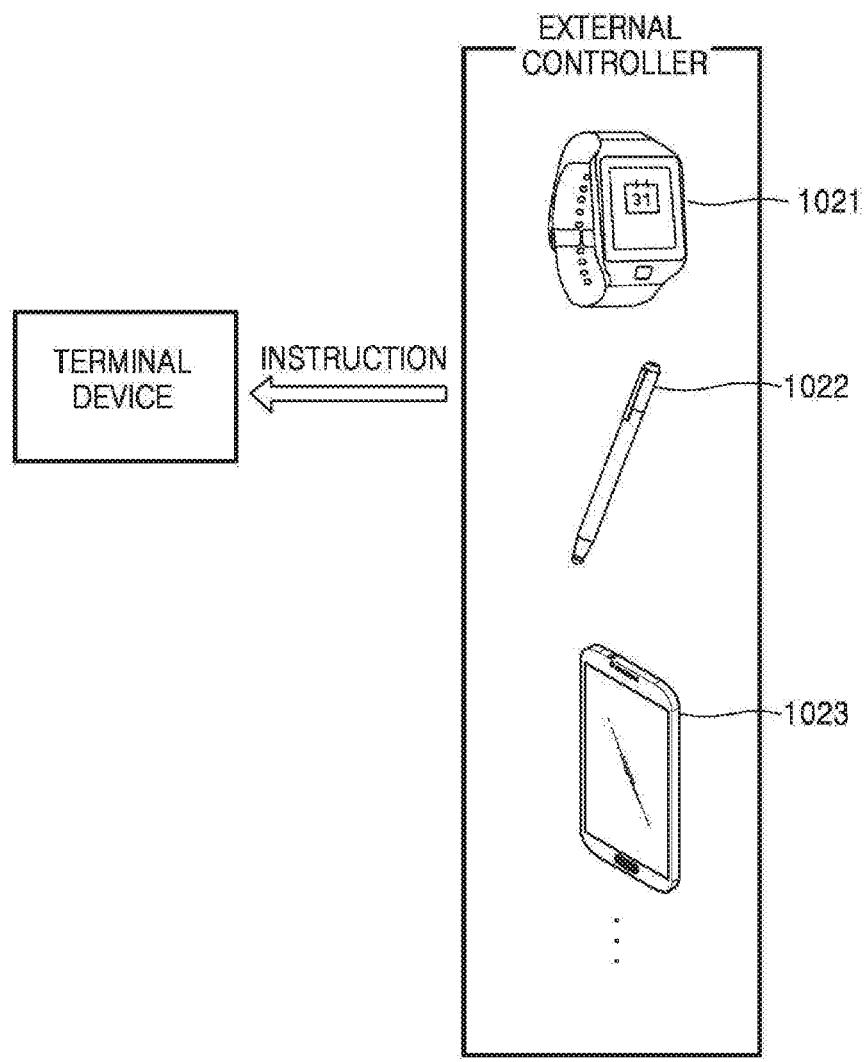
FIG. 10D is a diagram showing an example of receiving a privacy-mode-related instruction from an external controller according to an exemplary embodiment.

FIG. 10D is a diagram showing an example of receiving a privacy-mode-related instruction from an external controller according to an exemplary embodiment. As shown in FIG. 10D, the terminal device may receive an instruction from an external controller.

The external controller may be a stylus 1022 associated with the terminal device. For example, when detecting that the stylus is taken out and inserted back rapidly, a predefined button of the stylus is pressed, or the user makes a predefined air gesture using the stylus, the terminal device determines that a corresponding instruction is received. The external controller may also be a wearable device 1021 or another device 1023 associated with the terminal device. The wearable device 1021 may be a smart watch or smart glasses. The other device 1023 may include another cellphone, another accessory, an attachment, or an independent device. The wearable device 1021 may establish a connection with the terminal device via any one of the following manners:

Wi-Fi, NFC, Bluetooth, and data network. The wearable device or the other device may generate the privacy mode activation instruction, the instruction for showing the designated multimedia content, the instruction for hiding the designated multimedia content, and/or the confirmation instruction via at least one of the following manners: voice, button, gesture, and biometric feature.

According to various exemplary embodiments, the user merely needs to designate the multimedia content. Then the terminal device may find other multimedia content that has the same semantic information with the designated multimedia content. In response to detecting the instruction by the user for showing the designated multimedia content, the terminal device include the found multimedia content in the public multimedia content set, and exclude the found multimedia content from the private multimedia content set. In response to detecting the instruction of the user for hiding the designated multimedia content, the terminal device may include the found multimedia content in the private multimedia content set and exclude the found multimedia content from the public multimedia content set. As such, after the privacy mode is switched on, the private multimedia content may be hidden and the public multimedia content is displayed. The user merely needs to designate a few of the multimedia content to hide all other related multimedia content, and does not need to select and configure all the private multimedia content one by one, which simplifies the operation and increases the efficiency.

In addition, besides providing privacy protection to an entire video file, privacy protection may be more granularly given to a video image frame, a video segment and/or a part of a video image frame of the video that meet various privacy protection requirements of the user.

In the above method provided by the exemplary embodiments, before the privacy mode is switched on, after the privacy protection pre-configuration mode is switched on, or after the privacy mode is switched on, the user may adjust the private multimedia content and the public multimedia content. Furthermore, when the user designates the multimedia content in the privacy protection pre-configuration interface, multiple selections may need to be made. Therefore, for facilitating the user to designate the multimedia content again, the multimedia content that has been designated public or private may be displayed in the integrated manner (e.g., as composite images or image bundles), and other multimedia content may be displayed after being sorted, so as to facilitate the user to view them quickly.

In addition, the user is provided with multiple ways to issue the instructions. Therefore, issuing instructions may be convenient and flexible.

FIG. 11 is a flowchart showing a privacy protection method according to an exemplary embodiment.

In operation S201, a privacy mode activation instruction is detected.

In operation S202, multimedia content conforming to a particular type is found.

The particular type includes at least one of: a designated subject, a subject of the multimedia file designated by the user, a designated object, an object in the designated multimedia file, designated private information, and private information in the designated multimedia file.

The multimedia content conforming to the particular type may be taken as the above designated multimedia content. The designated multimedia content includes at least one of: multimedia content corresponding to the designated subject; multimedia content corresponding to the subject of the designated multimedia file; multimedia content containing the designated object; multimedia content containing the object in the designated multimedia file; multimedia content containing the designated private information; and multimedia content containing the private information of the designated multimedia file. The terminal device finding the multimedia content conforming to the particular type means that the terminal device finds the multimedia content having the same semantic information with the designated multimedia content.

In operation S203, it is determined whether an instruction for showing the designated multimedia content or an instruction for hiding the designated multimedia content is received. If the instruction for showing the designated multimedia content is received, operation S204 is executed; and if the instruction for hiding the designated multimedia content is received, operation S205 is executed.

In operation S204, the multimedia content found in operation S202 is included in the public multimedia content set but excluded from the private multimedia content set.

In operation S205, the multimedia content found in operation S202 is included in the public multimedia content set but excluded from the private multimedia content set.

In operation S206, after a confirmation instruction is detected, the privacy mode is turned on, the public multimedia content set is displayed, and the private multimedia content set is hidden.

If the particular type includes the designated subject and/or the subject of the designated multimedia file, the user may designate one or more subjects to be hidden (or to be shown) (e.g., scenic views, buildings, pets, portraits and night views). According to the designated subject, the terminal device finds the multimedia content (i.e., image, part of image, video, video segment, video image frame, part of video image frame, audio, audio segment) corresponding to the subject and hide (or show) the multimedia content. At this time, the multimedia content having the same semantic information with the multimedia content corresponding to the designated subject is the multimedia content conforming to the designated subject.

Alternatively, the user may designate at least one multimedia file. The terminal device determines the subject of the multimedia file by utilizing techniques such as image detection, image classification, and image recognition. Then, in combination with detailed information such as shooting time and shooting location, the terminal device finds all multimedia content (e.g., image, part of image, video, video segment, video image frame, part of video image frame, audio, audio segment) conforming to the determined subject and hides (or shows) the multimedia content. At this time, the multimedia content having the same semantic information with the multimedia content corresponding to the subject of the designated multimedia file is the multimedia content conforming to the determined subject.

Figure 12:
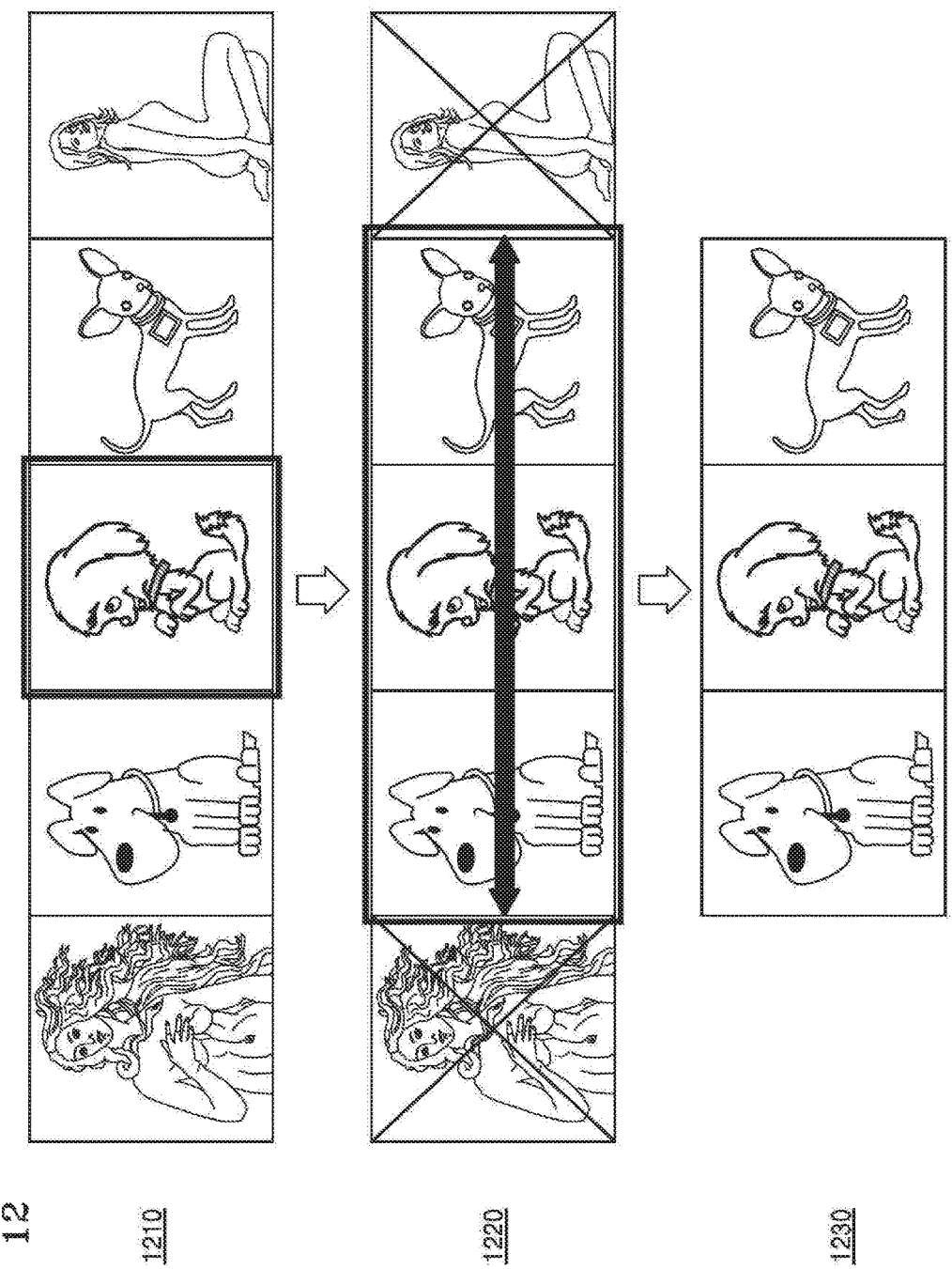
FIG. 12 is a diagram showing a user interface of a terminal device when the terminal device determines a subject corresponding to an image designated by a user according to an exemplary embodiment.

FIG. 12 is a diagram showing a user interface of a terminal device when the terminal device determines a subject corresponding to an image designated by a user according to an exemplary embodiment.

As shown in FIG. 12, the terminal device is storing images of two subjects: dogs and people. In this example, the user wants to show the images of dogs. Thus, the user selects an image of a dog and issues an instruction for showing the designated multimedia content. The terminal device determines that the subject of the designated image is a dog and finds all images conforming to this subject. Therefore, all images depicting a dog may be found. The terminal device determines that the found images are available for public viewing whereas other images (i.e., images with the subject of people need to be hidden).

In the exemplary embodiments, the subject of the multimedia content may be determined according to object type, event type or scenario type corresponding to the multimedia content. For example, if the object type corresponding to the multimedia content is people, the subject may be determined as people. If the event type corresponding to the multimedia content is sports, the subject may be determined as sports. If the scenario type (i.e., environment type) corresponding to the multimedia content is outdoors, the subject may be determined as outdoors.

If the particular type includes the designated object and/or object in the designated multimedia file, the user may designate one or more objects such as user A and user B that need to be hidden (or are available for public viewing). According to the designated object, the terminal device finds the multimedia content (e.g., image, part of image, video, video segment, video image frame, part of video image frame, audio, audio segment) which includes the designated object and other various objects or includes only the designated object, and hides (or shows) the multimedia content. At this time, the multimedia content which includes the designated object and other objects or includes only the designated object is the multimedia content having the same semantic information with the multimedia content containing the designated object.

Alternatively, the user may designate one or more objects in at least one multimedia file (e.g., designating an image of people and selecting one or more faces). According to the designated object, the terminal device finds the multimedia content (e.g., image, part of image, video, video segment, video image frame, part of video image frame, audio, audio segment) including the designated object and other various objects or including only the designated object, and hides (or shows) the multimedia content. At this time, the multimedia content which includes the designated object and other various objects or includes only the designated object is the multimedia content having the same semantic information with the multimedia content containing the designated object.

If the particular type includes the private information and/or the private information in a designated multimedia file, the user may designate one or more kinds of private information to be hidden (or to be shown) (e.g. personal identity information, personal account information, private images, and personal items, etc.). The terminal device finds the multimedia content (e.g., image, part of image, video, video segment, video image frame, part of video image frame, audio, audio segment) which includes the designated private information and hides (or shows) the multimedia content. At this time, the multimedia content including the designated private information is the multimedia content having the same semantic information with the multimedia content containing the designated private information.

Alternatively, the user may designate one or more multimedia files containing private information (e.g., designating an image containing a driver's license). According to the designated multimedia file, the terminal device obtains the privacy type of the private information contained in the designated multimedia file by utilizing techniques such as image detection, image classification, and image recognition, and finds the multimedia content (e.g., image, part of image, video, video segment, video image frame, part of the video image frame, audio, audio segment) which includes private information of the determined privacy type, and hides (or shows) the multimedia content. At this time, the multimedia content including the private information of the determined privacy type is the multimedia content having the same semantic information with the multimedia content containing the private information of the designated multimedia file.

In the exemplary embodiments described above, the user may generate a privacy mode deactivation instruction via any one or any combination of the following: voice, button, gesture, biometric feature, augmented reality man-machine interactive interface, and external controller. After detecting the privacy mode deactivation instruction, the terminal device terminates the privacy mode; or the terminal device may also automatically detect the current environment type and the user type of the current user, and completely or partially terminate the privacy mode.

According to an exemplary embodiment, the user designates the particular type (e.g., at least one of subject, object and private information). The terminal device may determine the multimedia content (to be hidden or to be shown) conforming to the designated type according to the type designated by the user. Alternatively, the user may designate a multimedia file. The terminal device may determine a particular type (e.g., at least one of the type of the subject of the multimedia file, the type of the object contained in the multimedia file, and the type of the private information contained in the multimedia file) according to the multimedia file designated by the user, and then identify the multimedia content (to be hidden or to be shown) conforming to the determined type. Thus, relevant multimedia content may be hidden without having to manually select them one by one. Thus, the operation is simplified and the efficiency is increased.

According to an exemplary embodiment, the private multimedia content set and the public multimedia content set may be determined based on the user type of the user or the environment type of the environment where the terminal device is located.

Figure 13:
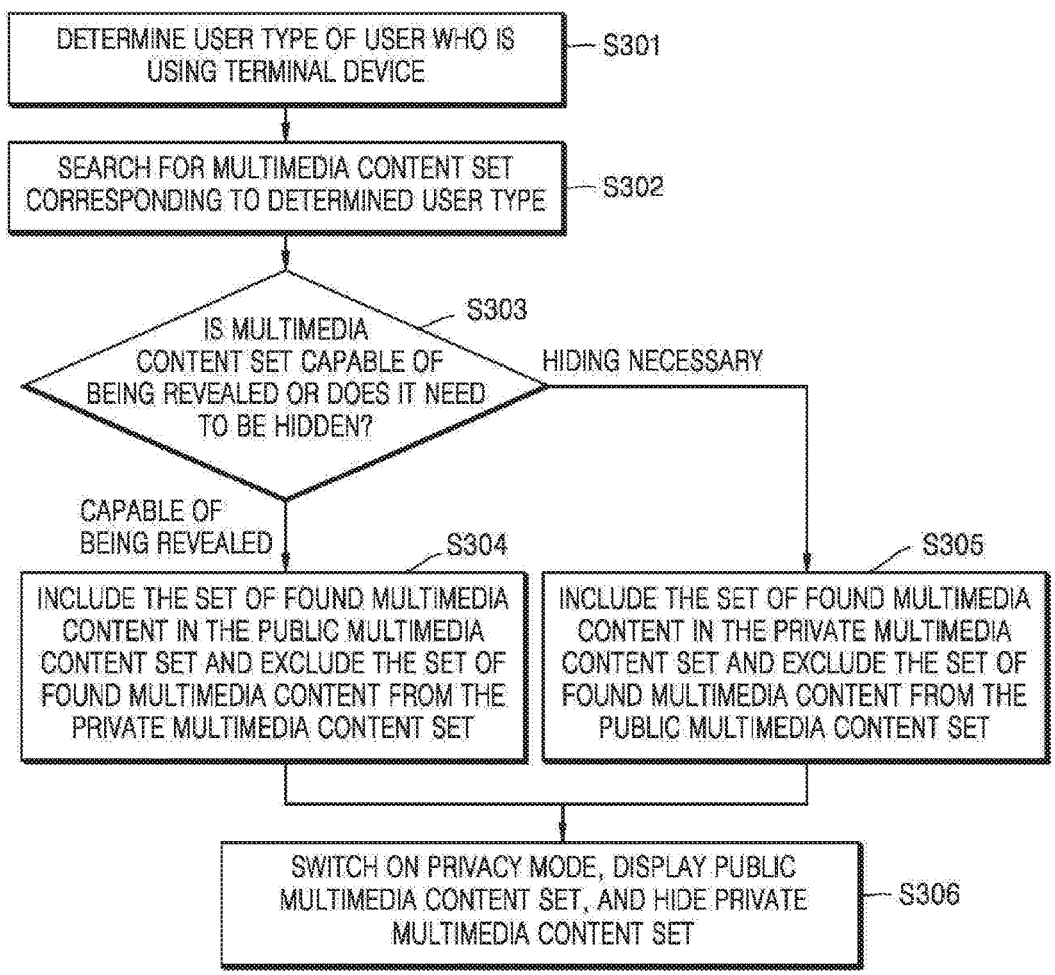
FIG. 13 is a flowchart showing a privacy protection method of determining a multimedia content set based on a user type according to an exemplary embodiment.

FIG. 13 is a flowchart showing a privacy protection method of determining a multimedia content set based on a user type according to an exemplary embodiment.

In operation S301, the user type of the user currently using the terminal device (i.e., the owner, or another one who currently uses the terminal device) is determined.

In some exemplary embodiments, operation S301 may be executed after the privacy mode activation instruction is detected, or may be executed after the starting of a privacy-relevant application such as multimedia application is detected.

The owner may define multiple user types in advance. Each user type corresponds to a public multimedia content set and/or a private multimedia content set.

The owner may manually classify users in the contacts and a chat application as different user types. Alternatively, this may be executed automatically by the terminal device. For example, the terminal device automatically detects faces in the multimedia content. If a face is consistent with the photo of a contact in the contacts, the terminal device classifies the contact to a corresponding user type according to the group that the contact belongs to. Or, based on a chat history and/or a messaging history of a chat application, the relationship between the owner of the terminal device and different contacts may be assessed. Then, based on the closeness of the relationship (e.g., based on the frequency of contact), the contacts may be classified as different user types.

In addition, one or more kinds of feature information corresponding to each user may be saved in the terminal device in advance (e.g., facial feature, voiceprint feature, handwritten signature feature, and other biometric feature such as fingerprint, heart rate, etc.). In some exemplary embodiments, the feature information of the user currently using the terminal device is detected and is compared with the pre-stored feature information, so as to determine the user currently using the terminal device and then determine the user type of the user.

For example, the owner of the terminal device is added to the user type with highest privileges. The photo information, fingerprint information, handwritten signature information, and/or voiceprint information of the owner are recorded. When the owner uses the terminal device, the terminal device detects whether the user currently using the terminal device is the owner based on the above saved feature information. If yes, all multimedia content of the terminal device are viewable.

In operation S302, a set of multimedia content corresponding to the user type determined in operation S301 is found.

In operation S303, it is determined whether the set of found multimedia content is available for public viewing or needs to be hidden. If it is available for public viewing, operation S304 is executed; and if it needs to be hidden, operation S305 is executed.

In operation S304, the set of found multimedia content is included in the public multimedia content set and excluded from the private multimedia content set.

In operation S305, the set of found multimedia content is included in the private multimedia content set and excluded from the public multimedia content set.

In operation S306, the privacy mode is switched on, the public multimedia content set is displayed, and the private multimedia content set is hidden.

Through the above operations S303-S305, the private multimedia content set may be determined based on the multimedia content found in operation S302.

If the determination is performed based on environment information, the user may predefine multiple environment types, wherein each environment type has a corresponding viewable multimedia content set or a corresponding multimedia content set that needs to be hidden. After receiving the privacy mode activation instruction of the user or detecting that a privacy-related application such as multimedia application is started, the terminal device may determine the environment type of the environment where the terminal device is current located (i.e., the current environment) based on GPS, imaging apparatus (e.g., a camera), voice or the environment information contained in user configuration (such as meeting mode, outdoor mode in a scenario mode configuration). Then, the terminal device finds the multimedia content set corresponding to the determined environment type (i.e., finds the public multimedia content or private multimedia content for the determined environment type), so as to obtain the public multimedia content set and the private multimedia content set. Finally, after the privacy mode is switched on, the public multimedia content set is displayed and the private multimedia content set is hidden. For example, the multimedia content that is unsafe or unsuitable for the determined environment type is found and marked as private multimedia content, and the multimedia content that is safe or suitable for the determined environment type is found and is marked as public multimedia content. As an example, if the determined environment type is a public outdoor environment in which many people may approach the terminal device, content that is not safe in the outdoor environment, that is, content including a private image, may be regarded as private multimedia content when found, and content that is safe in the outdoor environment, that is, content that does not include private details (e.g., an image such as a natural environment) may be regarded as public multimedia content when found. Thus, the terminal device may determine the multimedia content to be shown on the basis of multimedia content corresponding to an environment type of a current environment.

Figure 14:
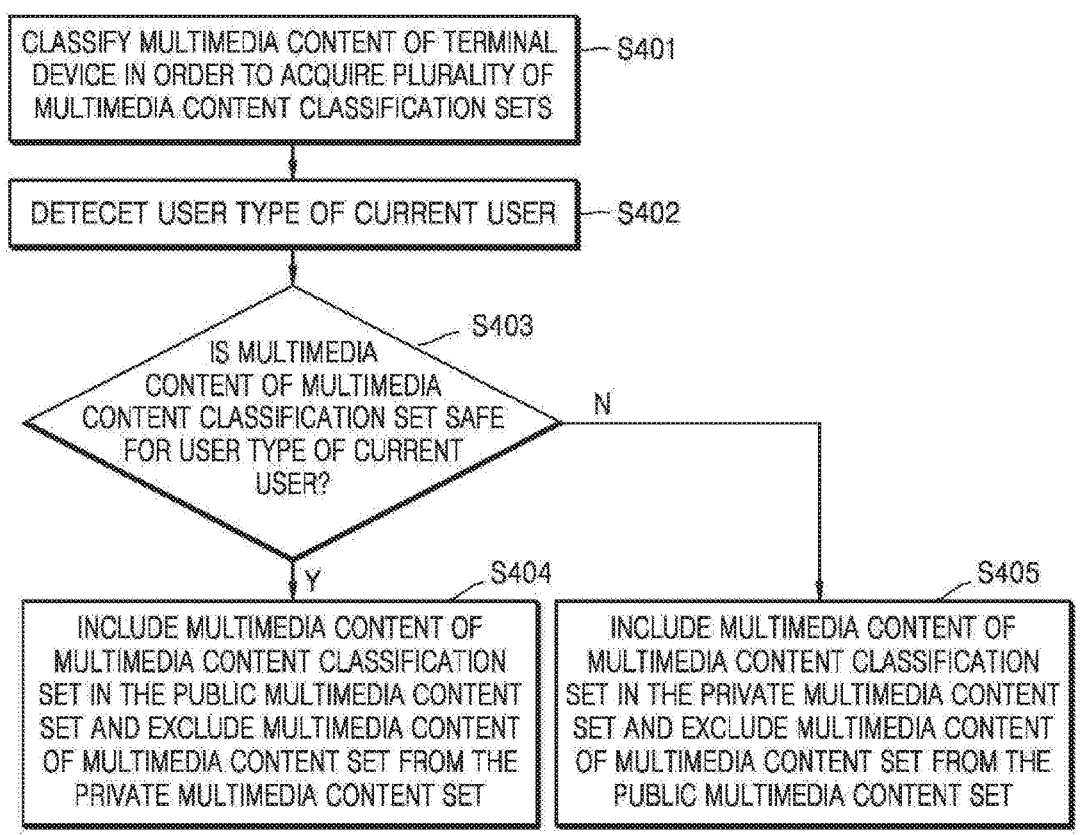
FIG. 14 is a flowchart for determining a multimedia content set to be shown or hidden on the basis of a user type of a current user according to an exemplary embodiment.

FIG. 14 is a flowchart for determining a multimedia content set to be shown or hidden on the basis of a user type of a current user according to an exemplary embodiment.

In operation S401, the multimedia content in the terminal device is classified to obtain multiple multimedia content classification sets.

For example, the multimedia content saved in the terminal device may be classified into: a personal set, a family set, an office set, an outdoor set, etc.

In operation S402, the user type of the current user is detected.

In particular, the current user may be detected via a imaging apparatus such as a camera, or may be detected via a combination of an unlocking manner, handwriting feature, gesture, biometric feature (such as fingerprint, heart rate) and a wearable device of the user. Then, the user type of the current user is determined.

In operation S403, with respect to each multimedia content classification set, it is determined whether the multimedia content in the multimedia content classification set is safe for the user type of the current user. If it is safe, operation S404 is executed; otherwise, operation S405 is executed.

In operation S404, the multimedia content in the multimedia content classification set is included in the public multimedia content set and excluded from the private multimedia content set.

In operation S405, the multimedia content in the multimedia content classification set is included in the private multimedia content set and excluded from the public multimedia content set.

Figure 15:
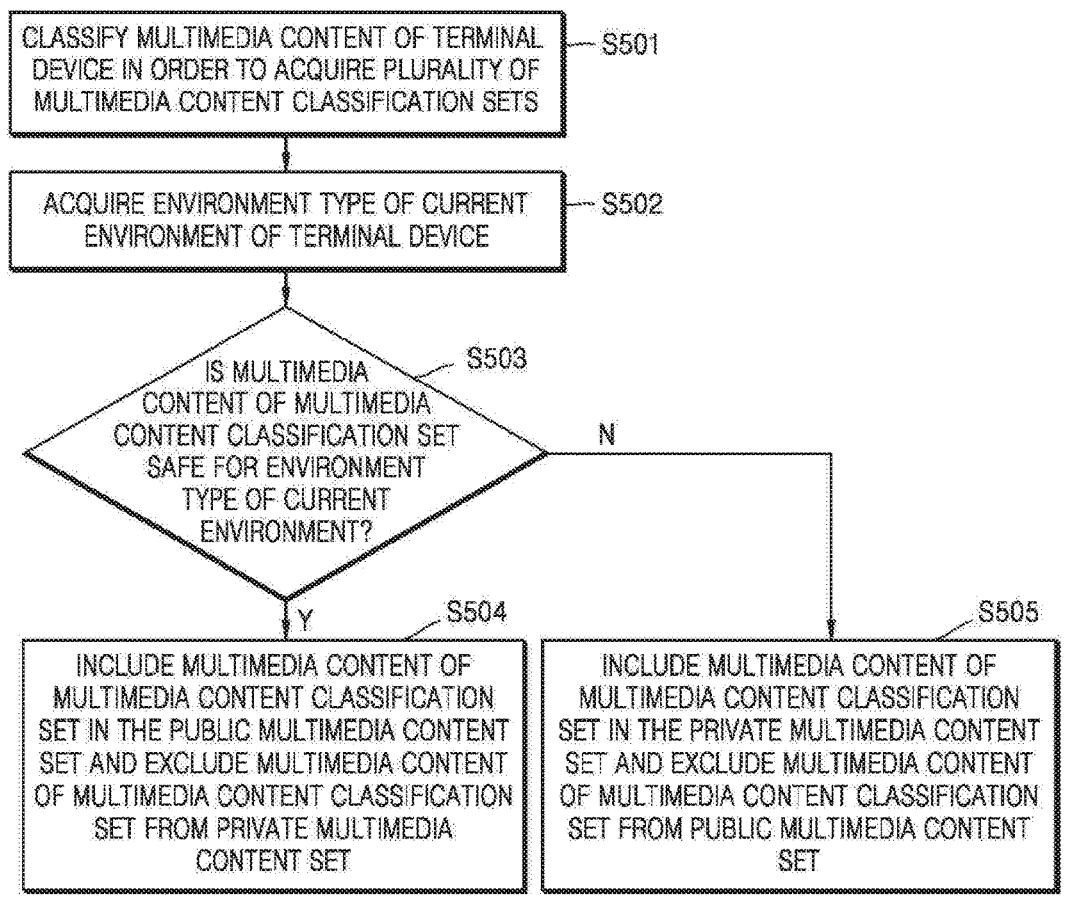
FIG. 15 is a flowchart for determining a multimedia content set to be shown or hidden on the basis of an environment type of a current environment according to an exemplary embodiment.

FIG. 15 is a flowchart for determining a private multimedia content set and a public multimedia content set based on the environment type of the current environment.

In operation S501, multimedia content in the terminal device are classified to obtain multiple multimedia content classification sets.

For example, the multimedia content saved in the terminal device may be classified into: a personal set, a family set, an office set, an outdoor set, etc.

In operation S502, the environment type of the environment where the terminal device is currently located (i.e. the current environment) is determined.

In particular, the environment type of the environment where the terminal device is currently located (i.e. the current environment) may be determined via GPS, an imaging apparatus, voice and environment information contained in user configuration (such as meeting mode, outdoor mode in scenario mode configuration).

In operation S503, with respect to each multimedia content classification set, it is determined whether the multimedia content in the multimedia content classification set is safe for the environment type of the current environment. If it is safe, operation S504 is executed; otherwise, operation S505 is executed.

In operation S504, the multimedia content in the multimedia content classification set is included in the public multimedia content set and excluded from the private multimedia content set.

In operation S505, the multimedia content in the multimedia content classification set is included in the private multimedia content set and excluded from the public multimedia content set.

In addition, it is also possible to determine, based on a combination of the user type of the user currently using the terminal device (i.e. the owner or the one using the terminal device) and the environment type of the environment where the terminal device is currently located, which multimedia content is safe for the environment type and the user type and which multimedia content is unsafe for the environment type and the user type.

According to exemplary embodiments illustrated above, the terminal device may automatically determine the private multimedia content set and the public multimedia content set according to the user type of the current user and/or the environment type of the current environment. Thus, such automatic determination of privacy protection scope simplifies the operation and increases the efficiency.

According to an exemplary embodiment, privacy mode of the terminal device may be switched on via following manners: quick activation and customized activation.

Figure 16:
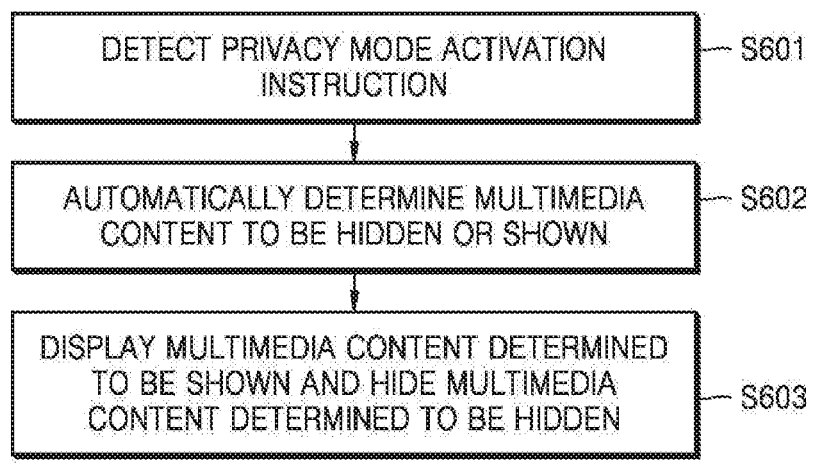
FIG. 16 is a flowchart for determining a multimedia content set to be shown or hidden on the basis of a quick activation method according to an exemplary embodiment.

FIG. 16 is a flowchart for determining a multimedia content set to be shown or hidden on the basis of a quick activation method according to an exemplary embodiment.

In operation S601, the terminal device may detect a privacy mode quick activation instruction. The privacy mode quick activation instruction may be distinguished from the privacy mode activation instruction.

In operation S602, the terminal device may automatically determine multimedia content to be hidden or shown (i.e., private or public multimedia content) in response to the privacy mode quick activation instruction.

In operation S603, the terminal device may display the multimedia content determined to be shown and hide the multimedia content determined to be hidden.

In quick activation mode, the user does not need to designate the private or public content. The terminal device automatically determines the public multimedia content set and the private multimedia content set. The user first issues a privacy mode activation instruction via any one or any combination of: voice, button, gesture, biometric feature, augmented reality man-machine interactive interface, and external controller. After detecting the privacy mode activation instruction, the terminal device finds the multimedia content having the same semantic information with the designated multimedia content. At this time, the designated multimedia content is the multimedia content conforming to a "hide" criterion or a "show" criterion. If the designated multimedia content conforms to the hide criterion, the found multimedia content is not included in the public multimedia content set and included in the private multimedia content set. If the designated multimedia conforms to the show criterion, the found multimedia content is included in the public multimedia content set and excluded from the private multimedia content set. Finally, after detecting a confirmation instruction, the terminal device switches on the privacy mode, displays the public multimedia content set, and hides the private multimedia content set.

The hide criterion includes at least one of: the designated multimedia content includes designated private information (e.g. including personal identity information); the subject of the designated multimedia content is a designated subject.

The show criterion includes at least one of: the designated multimedia content does not include designated private information (e.g., the multimedia content of a scene of a public spot); the subject of designated multimedia content is not the designated subject; the multimedia content containing only the user currently using the terminal device where the designated subject may be people.

According to an exemplary embodiment, the terminal device may find the multimedia content having the same semantic information with the multimedia content conforming to the hide or show criterion as discussed above in the multimedia content not having been viewed, so as to determine the private and public multimedia content, and automatically enter the privacy mode.

If the user issues the privacy mode activation instruction via the external controller, the external controller may be a stylus, a wearable device, or another device associated with the terminal device. The wearable device may be a smart watch or smart glasses. The other device may be a cellphone, an accessory, an attachment, an independent device, etc. The wearable device or the other device may be connected with the terminal device via, for example, Wi-Fi, NFC, Bluetooth, and data network.

For example, the terminal device may be used by a friend of the user (i.e., owner) of the terminal device. However, the privacy mode has not been switched on yet. The user is suddenly reminded of the private images in the album that he does not want to be seen by the friend. At this time, the user may issue the privacy mode activation instruction via the external controller, so as to instruct the terminal device to switch on the privacy mode.

With quick activation of the privacy mode, the terminal device may detect the multimedia content having the same semantic information with the multimedia content conforming to the above hide or show criterion via techniques such as scenario detection and people detection in image recognition. Furthermore, the terminal device may determine whether the multimedia content contains private scene via an image recognition algorithm, and recognizes the text in the multimedia content via optical character recognition (OCR) technique and handwriting recognition technique, and then determine whether the multimedia content contains private information such as personal identity information, personal account information, financial information, banking information, and instantly hide the above multimedia content.

The terminal device may automatically analyze the history configuration information of the user, and determine the multimedia content which was once determined to be private (i.e. multimedia content previously designated as private) to be included in the private multimedia content set, and determine the multimedia content which was once determined to be public (i.e., multimedia content previously designated as public) to be included in the public multimedia content set, and then hide the private multimedia content set. As such, the multimedia content related to the privacy of the owner may be protected from being exposed to the general public. The advantage of the quick activation is that the terminal device is able to automatically determine the public or private multimedia content, and rapidly switch on the privacy mode in emergency without requiring an additional user interaction.

After switching on the privacy mode, the terminal device may sort the multimedia content in the multimedia content set according to at least one of the following: similarity or relatedness to the designated multimedia content, corresponding subject, corresponding object, and contained private information. Then, the terminal device displays the sorted multimedia content.

Figure 17:
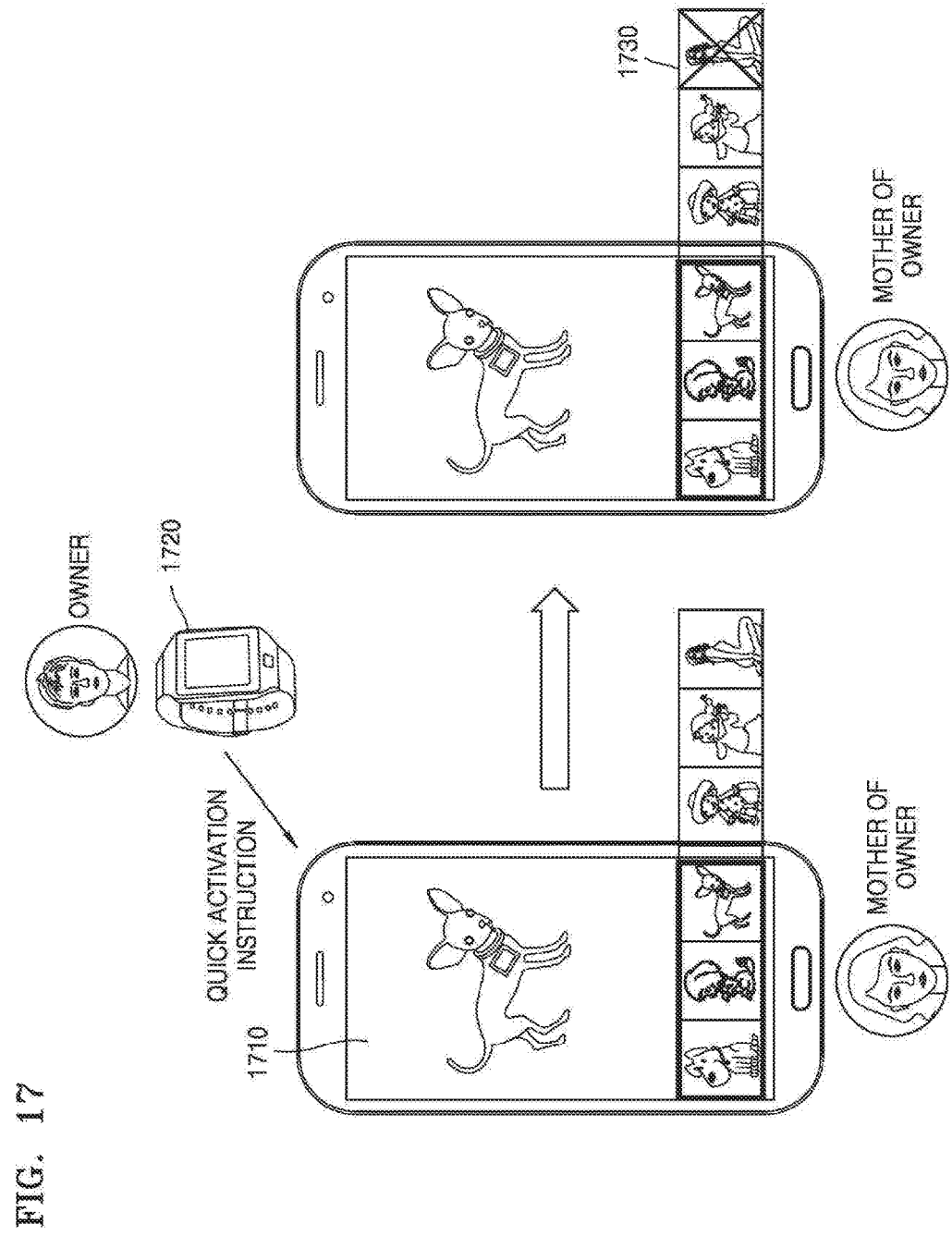
FIG. 17 is a reference diagram illustrating quick activation of the privacy mode according to an exemplary embodiment.

The terminal device may adjust the displaying order of the multimedia content in the viewable multimedia content set according to the objects corresponding to the multimedia content, and then display the sorted multimedia content. The higher the degree of privacy of the object corresponding to the multimedia content, the lower the multimedia content is ranked. For example, as shown in FIG. 17, the terminal device may determine that images of a pet dog, group images of a pet dog and a child, and images of a child are multimedia content that are available for public viewing. Therefore, after the privacy mode is switched on, the terminal device displays the images of the pet dog with higher priority, then displays the group images of the pet dog and the child, and finally displays the images of the child. As such, the multimedia content containing privacy of the owner is protected from being exposed to the general public.

As shown in FIG. 17, a mother of the owner of the terminal device is viewing images 1710 through the terminal device of the owner. In order to hide privacy-related images among the images stored in the terminal device from his mother, the owner may send the privacy quick activation instruction to the terminal device using a smart watch 1720. When the privacy quick activation instruction is received, the terminal device of the owner may automatically determine content to be hidden among images stored therein and hide a privacy-related image 1730.

With customized activation, the user is given a chance to designate the multimedia content, which may include at least one of: multimedia content in a designated multimedia file, designated content in a designated multimedia file, multimedia content containing a designated object, multimedia content containing an object of a designated multimedia file, multimedia content containing designated private information, multimedia content containing private information in a designated multimedia file; multimedia content corresponding to a user type of a current user, multimedia content corresponding to an environment type of the current environment. The terminal device determines the public multimedia content set according to the multimedia content designated by the user in manners similar to those described with reference to exemplary embodiments above.

With customized activation of the privacy mode, the user may switch on the privacy mode of the terminal device via an external controller having an input and/or display function. The input function may support a button input, a voice input or a touch screen input, etc., so as to allow the user to select the multimedia content. The display function is used for displaying the content of the terminal device in real time. The privacy protection method is similar to the procedure described in exemplary embodiments above with regard to the privacy mode activation instruction, the instruction for showing the designated multimedia content, the instruction for hiding the designated multimedia content, and the confirmation instruction being generated via the external controller.

In particular, the user may inform the external controller to configure the private multimedia content set during the privacy protection of the terminal device via any one or any combination of: voice, button, gesture, biometric feature, and augmented reality man-machine interactive interface. After detecting an instruction for configuring the private multimedia content set during the privacy protection of the terminal device, the external controller detects whether the terminal device has switched on the privacy mode. The external controller may obtain the current privacy protection state of the terminal device via a data connection between the external controller and the terminal device. If the external controller detects via the current privacy protection state of the terminal device that the terminal device has not switched on the privacy mode yet, the external controller may transmit a privacy mode activation instruction to the terminal device. After detecting the privacy mode activation instruction transmitted by the external controller, the terminal device may perform pre-processing to the multimedia content not having been viewed, and sort the multimedia content not having been viewed based on at least one of subject, object and private information of the multimedia content and then display the sorted multimedia content. For example, the multimedia content depicting a public location, a non-human object, or only the viewer himself may be displayed with higher priority. The external controller may determine the private multimedia content set during privacy protection of the terminal device based on the user-selected multimedia content, and transmit a configuration instruction corresponding to the private multimedia content set to the terminal device. After receiving the configuration instruction transmitted by the external controller, the terminal device may determine the private multimedia content set and the public multimedia content set according to the configuration instruction, hide the private multimedia content set, and displays the public multimedia content set.

After detecting the privacy mode activation instruction transmitted by the external controller, the terminal device may transmit the multimedia content not having been viewed in the terminal device to the external controller.

The external controller sorts the multimedia content not having been viewed in the terminal device according to at least one of: subject, object, and private information corresponding to the multimedia content. For example, the multimedia content that may be relevant to privacy may be displayed with higher priority (e.g., images of private location or person). Then, the sorted multimedia content is displayed, which facilitates the user to rapidly configure the multimedia content needs to be hidden or available for public viewing.

According to exemplary embodiments, after the user configures the public multimedia content or the private multimedia content on the external controller, the external controller may transmit the configuration of the user to the terminal device in real time. The terminal device adjusts the currently displayed content in real time. Alternatively, the external controller may also transmit the configuration of the user to the terminal device after the user finishes the configuration and confirms to switch on the privacy mode. Then, the terminal device determines the private or public multimedia content according to the configuration of the user.

Figure 18:
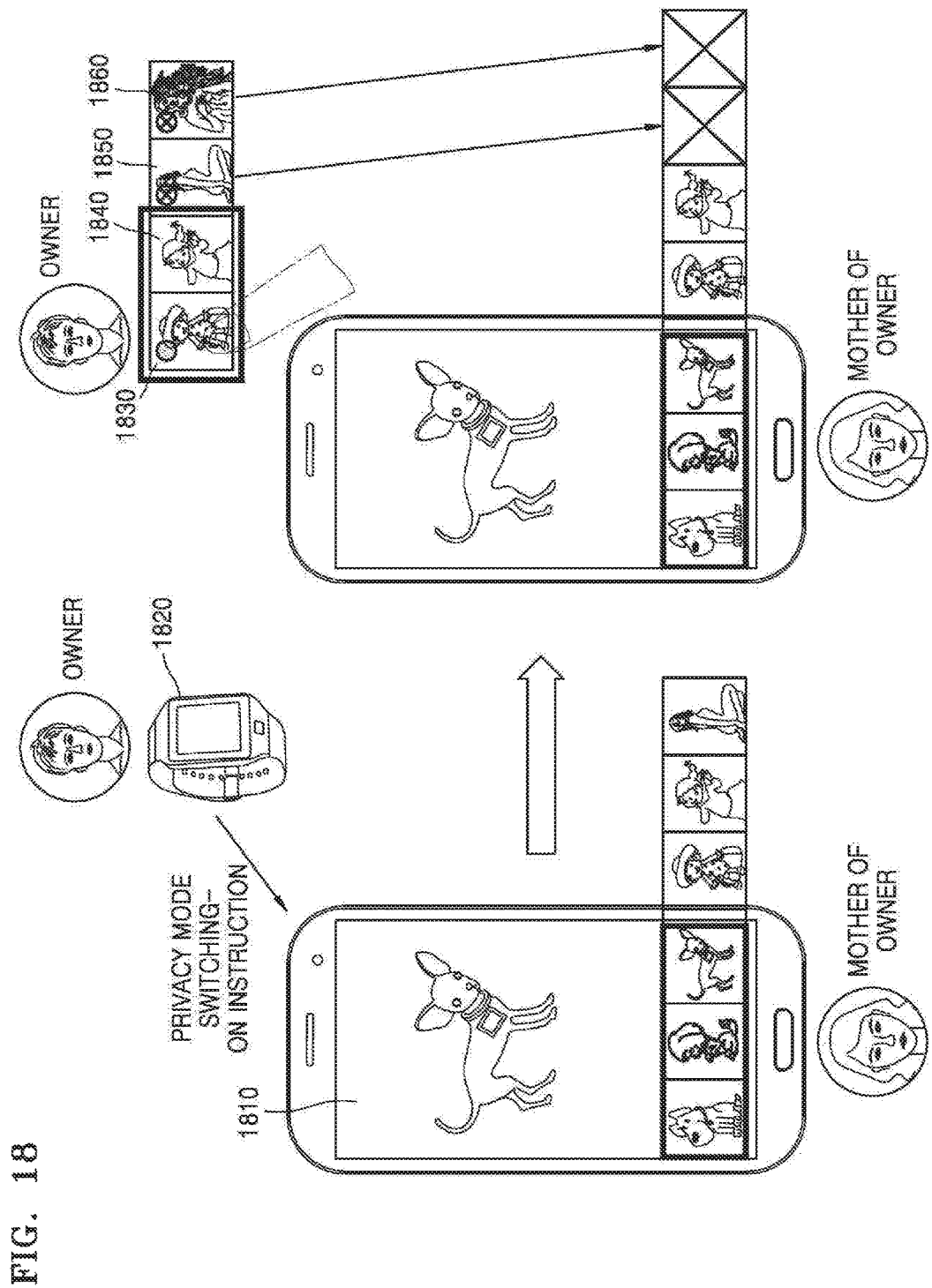
FIG. 18 is a reference diagram illustrating an operation of indicating content to be shown or content to be hidden using an external controller according to an exemplary embodiment.

As shown in FIG. 18, a mother of the owner of the terminal device is viewing images 1810 through the terminal device of the owner. In order to hide private images among images stored in the terminal device from his mother, the owner may send the privacy mode activation instruction to the terminal device using an external controller 1820. Also, the terminal device may designate a private image using the external controller 1820 and generate an instruction for hiding the designated image. The instruction may be sent in real time. For example, the owner may designate images 1850 and 1860 to be hidden and may designate images 1830 and 1840 to be shown. When an instruction corresponding to the designation is received from the external controller 1820, the terminal device may hide the images 1850 and 1860.

According to an exemplary embodiment, the user may rapidly switch on the privacy mode on the terminal device using the external controller.

The terminal device may automatically find private multimedia content set and public multimedia content set by utilizing quick activation. In some special cases, for example, the terminal device is used by a person other than the owner when the privacy mode is not switched on, the terminal device is able to automatically switch on the privacy mode by utilizing quick activation of the privacy mode and provides privacy protection to the private multimedia content.

According to an exemplary embodiment, in the privacy protection pre-configuration mode and after the privacy mode is switched on (i.e., during the privacy protection procedure), it is possible to adjust the private multimedia content set and the public multimedia content set in real time.

1) In the privacy protection pre-configuration mode, adjusting the private multimedia content set and the public multimedia content set.

In some exemplary embodiments, the private multimedia content set and the public multimedia content set may be adjusted after the privacy protection pre-configuration mode is switched on.

The adjustment may include at least one of the following: including the multimedia content which was shown in history in the public multimedia content set (i.e. the content not included in the public multimedia content set needs to be hidden); including the multimedia content which was hidden in history in the private multimedia content set (i.e. the content included in the private multimedia content set needs to be hidden); including the multimedia content associated with the multimedia content which is currently determined to be viewable in the public multimedia content set (i.e., the content not included in the public multimedia content set needs to be hidden); and including the multimedia content associated with the multimedia content which is currently determined to be hidden in the private multimedia content set (i.e., the content included in the private multimedia content set needs to be hidden).

For example, after entering the privacy protection pre-configuration mode, the terminal device determines the private or public multimedia content according to the designated multimedia content. When the user configures the designated multimedia content for a second time, the terminal device determines the private or public multimedia content according to the multimedia content configured in the second time. Then, the terminal device determines whether there is multimedia content in the terminal device which was once determined to be hidden (or available for public viewing). If there is such multimedia content, the terminal device finds multimedia content associated with the multimedia content which is currently determined to be hidden (or available for public viewing) and associated with the multimedia content which was once determined to be hidden (or available for public viewing), and determines that the following content needs to be hidden (or is available for public viewing): the multimedia content which is currently determined to be hidden (or available for public viewing), the multimedia content which was once determined to be hidden (or available for public viewing), and the found multimedia content. The terminal device determines the remaining multimedia content in the terminal device to be available for public viewing (or needs to be hidden).

Figure 19:
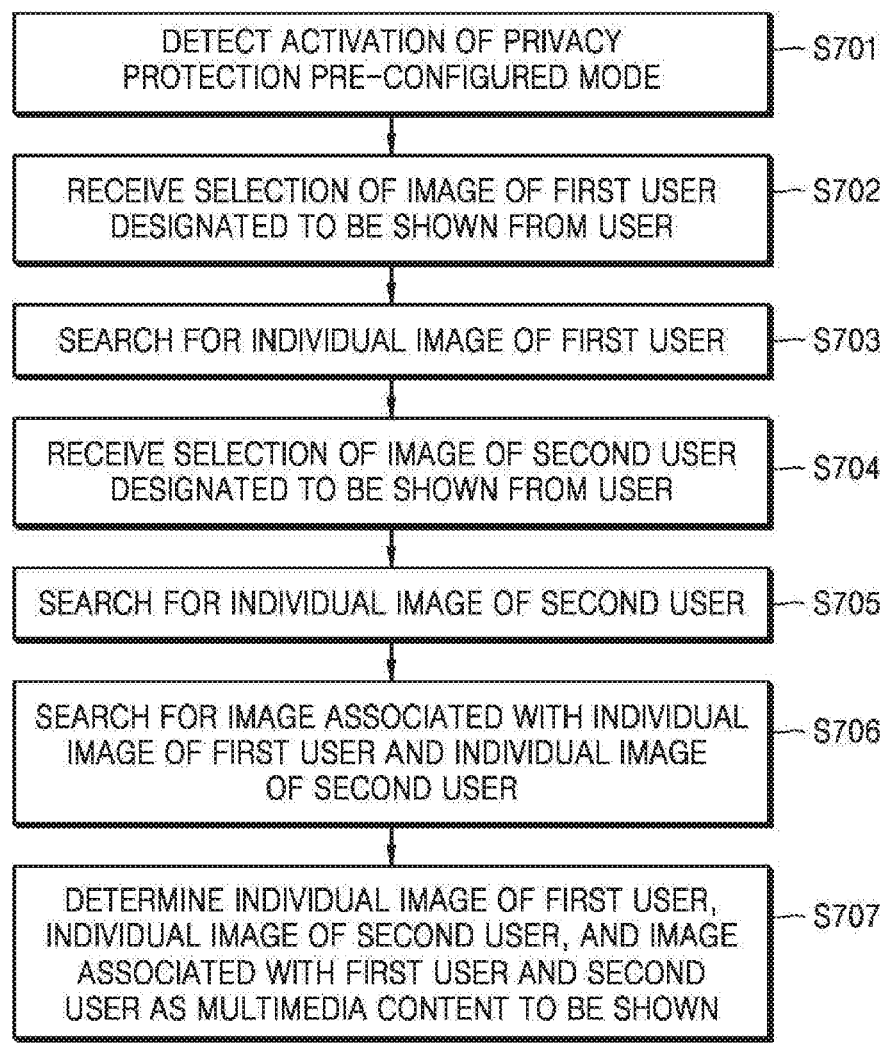
FIG. 19 is a flowchart illustrating an operation of a terminal device where a user sets a plurality of images to be shown.

FIG. 19 is a flowchart illustrating an operation of a terminal device where a user sets a plurality of images to be shown.

In operation S701, the terminal device detects activation of the privacy protection pre-configuration mode.

In operation S702, the terminal device may receive a selection of an image of a first user designated to be shown from a user.

In operation S703, the terminal device searches for an individual image of the first user designated by the user.

In operation S704, the terminal device receives a selection of a designated image of a second user from the user.

In operation S705, the terminal device searches for an individual image of the second user that is designated by the user.

In operation S706, the terminal device searches for an image associated with the individual image of the first user and the individual image of the second user.

In operation S707, the terminal device determines the individual image of the first user, the individual image of the second user, and an image associated with the first user and the second user as multimedia content set to be shown.

Figure 20:
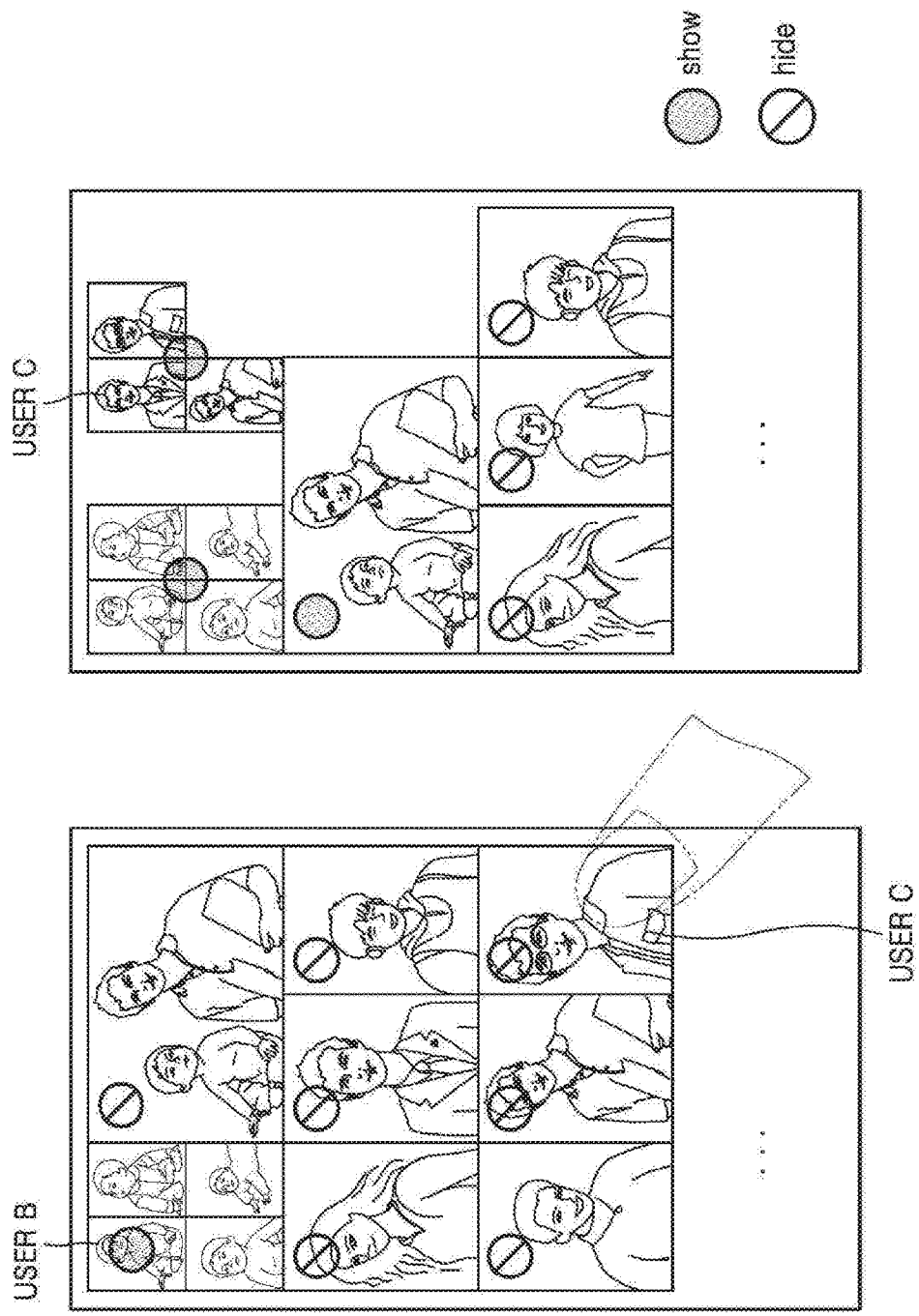
FIG. 20 is a diagram showing an example in which a user sets a plurality of images to be shown according to an exemplary embodiment.

For example, in FIG. 20, user A generates an instruction for designating an image of user B and showing the designated multimedia content. The terminal device finds all individual images of user B according to the designated image of user B and displays the found images to be shown. Also, when the user wants to show an image of user C, the user designates the image of user C. Accordingly, the terminal device finds all individual images of user C according to the designated image of user C and displays the found images to be shown. Accordingly, the terminal device determines whether there is an image associated with the individual images of user C that are currently found and the individual images of user B that are previously found. Accordingly, the terminal device may find all group images of user B and user C as shown in FIG. 20. Also, the terminal device displays the group images to be shown.

2) During the privacy protection procedure, adjusting the public and private multimedia content.

After the privacy mode is switched on, the terminal device displays in a displaying list only a list of public multimedia content set which is allowed to be viewed by other users and hides all the other multimedia content. During the displaying procedure, if the user wants to adjust the current public multimedia content, an additional designation may be performed based on the current display. The terminal device also needs to adjust the displaying list in real time.

In addition, after the privacy mode is switched on, the terminal device may sort the viewable multimedia content according to at least one of: similarity or relatedness with the designated multimedia content, corresponding subject, corresponding object, contained private information, and then display the sorted multimedia content.

The similarity to the designated multimedia content represents a matching degree with user's displaying intention. When the public multimedia content set is displayed, the multimedia content which conforms to the user's displaying intention best is displayed with higher priority, e.g., displaying in the following order: images that the user indicated to display, group images containing a person in an image that the user indicated to display.

After the privacy mode is switched on, the terminal device may determine whether additional protection is required through detecting the environment type of the current environment and the current user.

In particular, the terminal device detects the user currently using the terminal device, searches the multimedia content which is currently determined to be hidden for multimedia content that only includes the detected user, and displays the found multimedia content.

If there is one user currently using the terminal device, the multimedia content containing only the user is additionally displayed. If there are multiple users currently using the terminal device, the multimedia content containing group images of the multiple users is additionally displayed.

Figure 21:
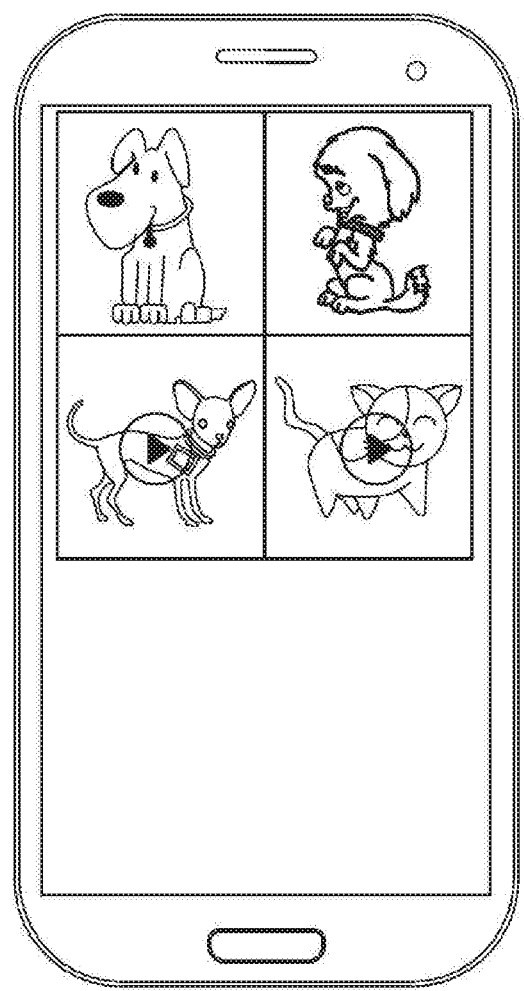
FIG. 21 is a diagram showing an initial user interface after a privacy mode is switched on according to an exemplary embodiment.

For example, after the terminal device switches on the privacy mode, an initial displaying interface is as shown in FIG. 21. At this time, what are displayed are the images and videos shot by the user outdoors. These images and videos do not contain people. Thereafter, when the multimedia content in the terminal device is viewed by a friend, the terminal device may detect the face in front of the screen via a front camera and compare the face with an object in the multimedia content in a multimedia library. If the detected face is consistent with that of an object in a multimedia content, the terminal device determines that the multimedia content containing the viewable object, and additionally display the multimedia content.

Figure 22:
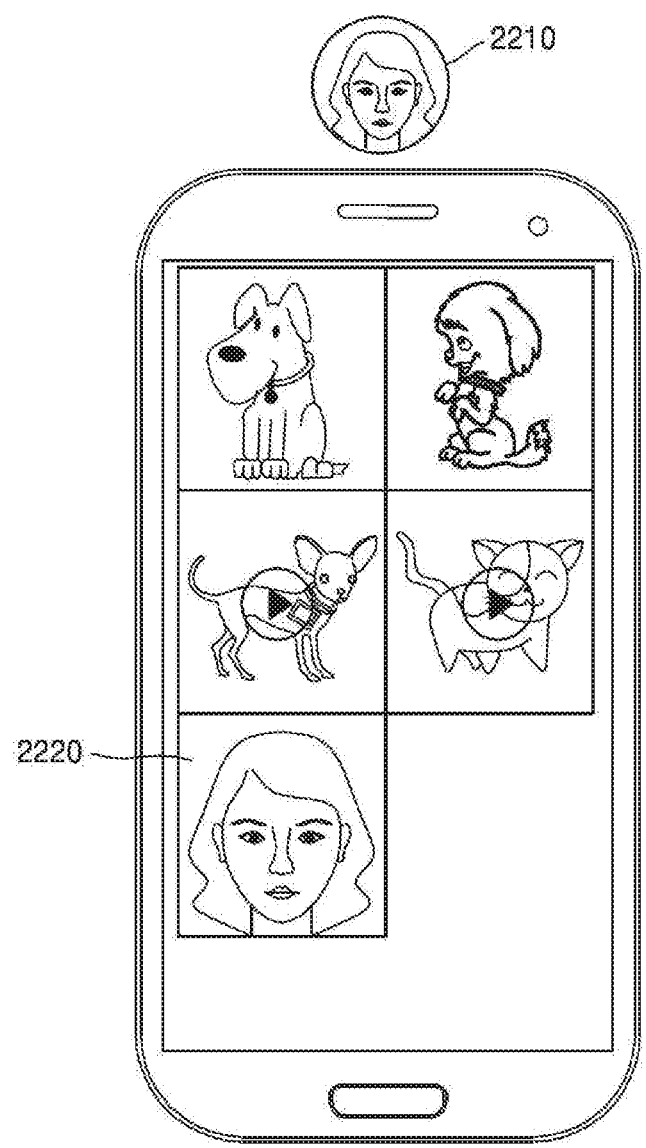
FIG. 22 is a diagram showing a user interface that additionally displays an individual image of a user who is using a terminal device.

FIG. 22 is a diagram showing a user interface that additionally displays an individual image of a user who is using a terminal device. When multiple friends view multimedia content stored in the terminal device, the terminal device may detect faces in front of a screen through a front camera and compare the detected faces with a face that is contained in an object of the multimedia content in a multimedia library. When any one of the detected faces matches the face contained in the object of the multimedia content, the terminal device determines multimedia content including a group image of the plurality of friends and additionally displays the multimedia content.

As shown in FIG. 22, the terminal device may collect a face of user D 2210 through the front camera, check whether the face of user D matches a face of an object of the multimedia content in the multimedia library, and additionally display an image 2220 of user D 2210.

Figure 23:
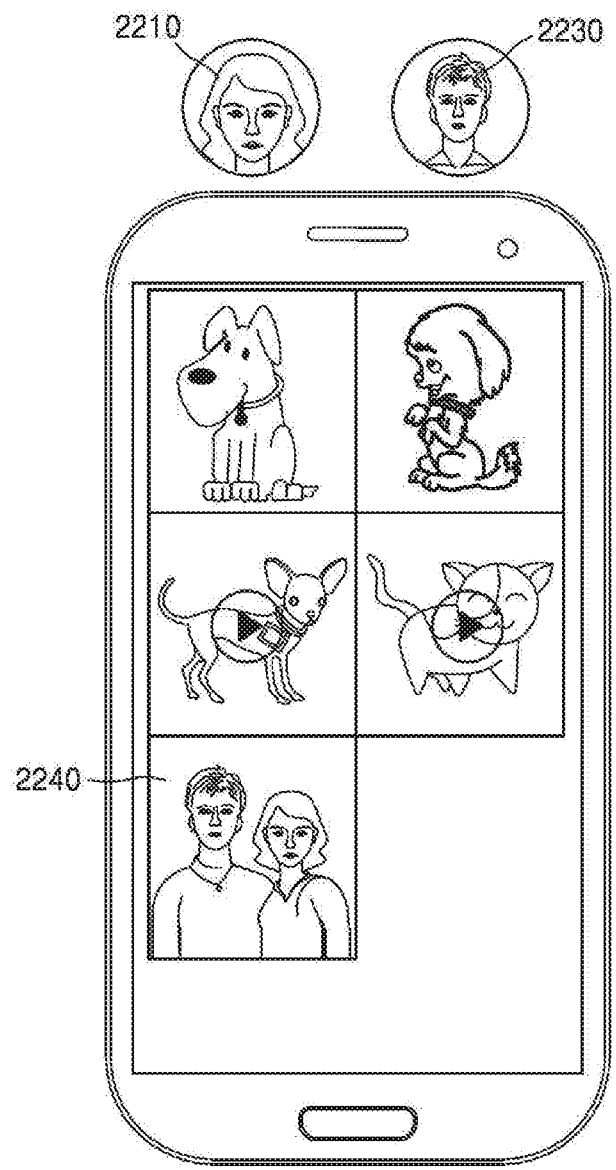
FIG. 23 is a diagram showing a user interface that additionally displays group images of a plurality of users who are using a terminal device.

FIG. 23 is a diagram showing a user interface that additionally displays group images of a plurality of users who are using a terminal device.

In FIG. 23, the terminal device may detect faces of user D 2210 and user E 2230 through the front camera, check whether the faces of user D and user E match faces of objects of the multimedia content in the multimedia library, and additionally display an image 2240 of user D and user E.

Similarly, after the privacy mode is switched on, the user may manually adjust the private or public multimedia content. The user may issue a multimedia content adjusting instruction via any one or any combination of: voice, gesture, biometric feature and external controller, such that the terminal device switches to the privacy protection pre-configuration mode and adjust the private or public multimedia content according to the multimedia content designated by the user. Then, the terminal device determines whether there is multimedia content in the terminal device which was once determined to be hidden (or available for public viewing). If there is such content, the terminal device finds multimedia content associated with the multimedia content which is currently determined to be hidden (or available for public viewing) and associated with the multimedia content which was once determined to be hidden (or available for public viewing), and determines the following as the private or public multimedia content needs to be hidden: the multimedia content which is currently determined to be hidden (or available for public viewing), the multimedia content which was once determined to be hidden (or available for public viewing), and the found multimedia content. The terminal device determines remaining multimedia content in the terminal device to be viewable (or needs to be hidden).

After detecting the multimedia content set adjusting instruction transmitted by the external controller, the terminal device adjusts the multimedia content set needs to be hidden according to the multimedia content set adjusting instruction.

When the user performs adjustment via the external controller, the user informs the external controller to configure the private multimedia content set during the privacy protection of the terminal device via any one or any combination of: voice, button, gesture, biometric feature, and augmented reality man-machine interactive interface. After detecting the instruction for configuring the private multimedia content during the privacy protection of the terminal device, the external controller detects whether the terminal device has switched on the privacy mode. The external controller may obtain the current privacy protection state of the terminal device via a data connection between the external controller and the terminal device. If the external controller detects via the current privacy protection state of the terminal device that the terminal device has switched on the privacy mode at present, the external controller determines, based on the designated multimedia content, the adjusted multimedia content obtained after adjusting the private multimedia content set during the privacy protection of the terminal device, and then transmits a multimedia content set adjusting instruction corresponding to the adjusted private multimedia content set to the terminal device. After detecting the multimedia content set adjusting instruction transmitted by the external controller, the terminal device adjusts the private multimedia content set according to the multimedia content set adjusting instruction.

After detecting that the terminal device has switched on the privacy mode, the external controller may obtain from the terminal device the multimedia content which is currently displayed on the terminal device for display. Then, the user is able to see the single-person images of user B which has been marked as viewable in the privacy protection pre-configuration mode on the external controller. Based on this, the user further designates images of user C to be viewable. The external controller informs the terminal device of the designated image of user C. The terminal device determines the single-person images of user C and marks them as public according to the designated image of user C. Then, the terminal device finds group images associated with the currently determined images of user C and associated with the previously determined images of user B, and marks the found group images of users B and C as public.

According to the exemplary embodiments discussed above, the private multimedia content set and the public multimedia content set may be adjusted. In particular, the multimedia content which was shown in history may be included in the public multimedia content set, and the multimedia content which was hidden in history may be excluded from the public multimedia content set. The multimedia content associated with the currently determined public multimedia content may be included in the public multimedia content set, and the multimedia content associated with the multimedia content which is currently determined to be hidden may be excluded from the public multimedia content set. Additionally or optionally, after the privacy mode is switched on, the multimedia content that only includes the current user may be additionally displayed. As such, various manners for adjusting the private multimedia content and public multimedia content are provided. Therefore, the adjustments may be made by the user more easily and seamlessly.

Figure 24:
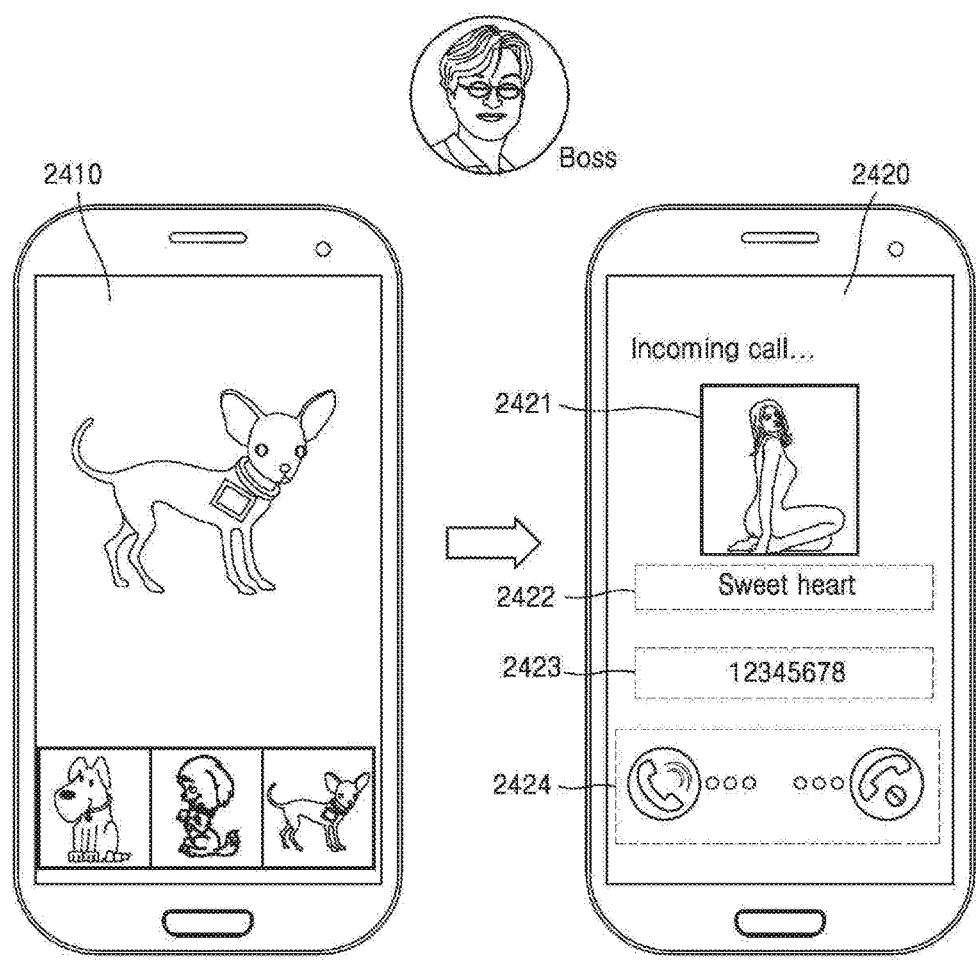
FIG. 24 is a reference diagram illustrating an example of providing privacy protection to prompt information displayed on a terminal device after a privacy mode is switched on according to an exemplary embodiment.

According to an exemplary embodiment, when the privacy mode is switched on, privacy protection may be provided to prompt information displayed on the terminal device. For example, as shown in FIG. 24, an incoming call is detected by the terminal device of the owner during a privacy protection mode 2410 of the terminal device. In this case, the terminal device may display incoming call prompt information 2420 on a screen. The incoming call prompt information may include a caller's photo 2421, a caller's name 2422, a caller's phone number 2423, an acceptance or rejection button 2424, etc. The photo, name, or phone number of the caller may constitute private information.

Figure 25:
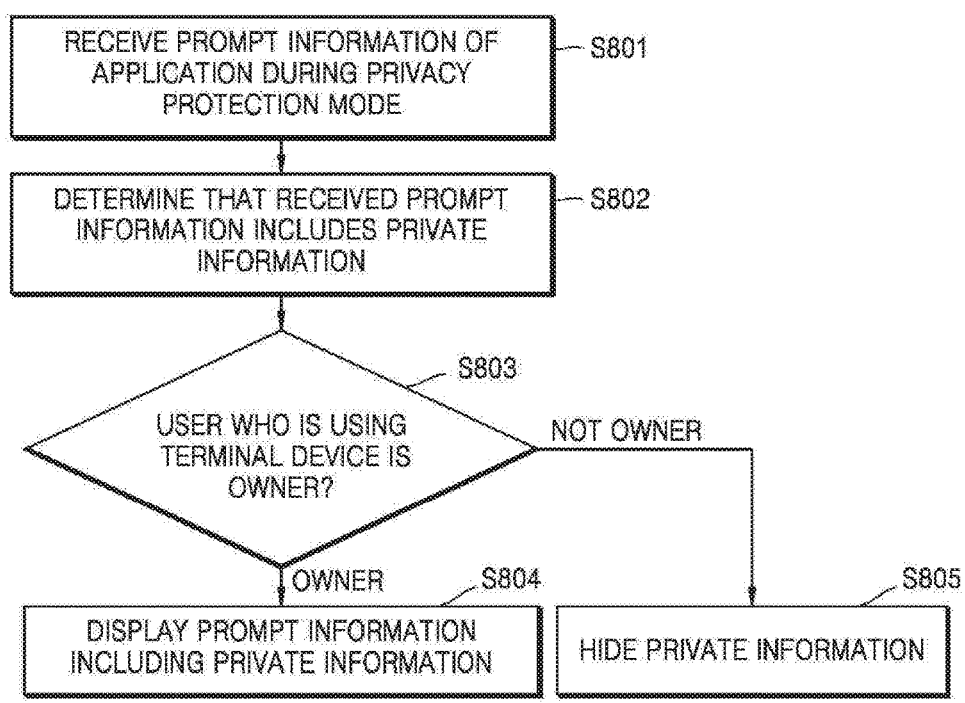
FIG. 25 is a flowchart showing an operation of a terminal device receiving prompt information of an application during a privacy protection mode according to an exemplary embodiment.

FIG. 25 is a flowchart showing an operation of a terminal device receiving prompt information of an application during a privacy protection mode according to an exemplary embodiment.

In operation S801, the terminal device may receive prompt information of an application during the privacy protection mode.

In operation S802, the terminal device may determine whether the received prompt information includes private information. If the terminal device determines that the received prompt information includes the privacy information, the terminal device may simply hide the private information contained in the prompt information.

In operation S803, the terminal device may determine whether a user who is using the terminal device is an owner of the terminal device.

In operation S804, when the user is the owner of the terminal device, the terminal device may display the prompt information including the private information on the terminal device.

In operation S805, when the user is not the owner of the terminal device, the terminal device may hide the private information contained in the received prompt information. The hiding of the private information contained in the received prompt information may include preventing the private information from being displayed or replacing the private information with predetermined content.

When the received prompt information includes the private information, the terminal device may also move the received prompt information to another terminal device to display the prompt information. The other terminal device may be a wearable device. After the received prompt information is transmitted to the other terminal device and then displayed, the original terminal device will not display the prompt information.

The prompt information of the application may include incoming call prompt information, text message (e.g., short message service (SMS) message) prompt information, chat message prompt information, email prompt information, schedule prompt information, and memo prompt information. It should be appreciated that the prompt information of the application may be another type of prompt information.

For example, it is assumed that the privacy mode is switched on, a friend of the owner of the terminal device holds the terminal device, and an incoming call is received when the friend is viewing images on the terminal device. The terminal device may display incoming call prompt information on the screen. The incoming call prompt information may include a photo, a name, a phone number, etc. of a caller. However, this type of information may be private information, and the owner of the terminal device may not want to reveal the information. Furthermore, as shown in FIG. 24, the friend may press a call acceptance button or a call rejection button that is included in the incoming call prompt information by mistake.

Figure 26:
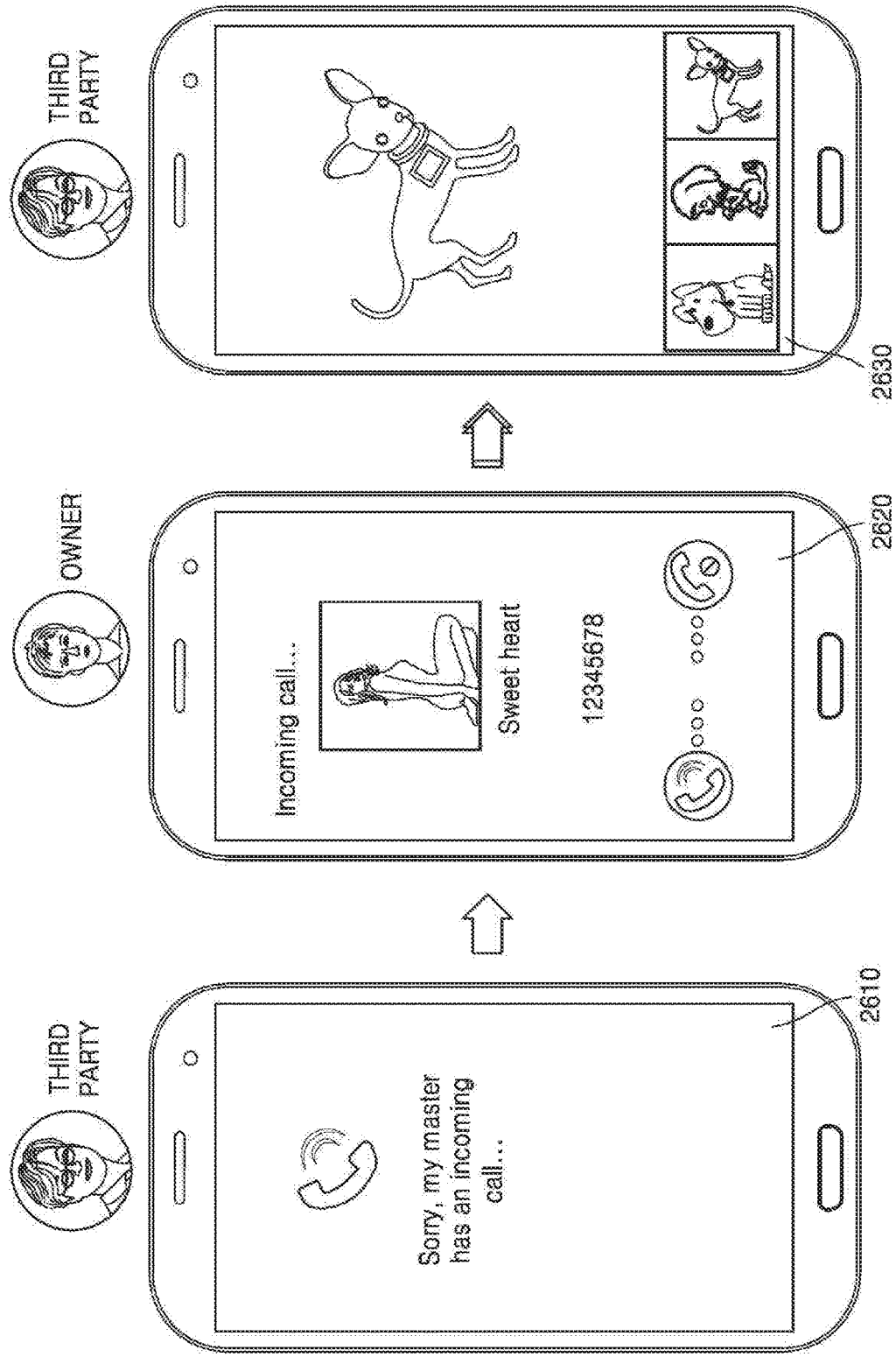
FIG. 26 is a diagram showing an example of hiding incoming call prompt information in a privacy protection mode according to an exemplary embodiment.

According to an exemplary embodiment, it is assumed that the privacy mode is switched on, a friend of the owner of the terminal device holds the terminal device, and an incoming call is detected when the friend is viewing images. The terminal device determines whether a user who is using the terminal device is the owner of the terminal device through a front camera. When the user is not the owner of the terminal device, the terminal device performs a prompt information protection function and disables a call acceptance button and the call rejection button in order to hide incoming call prompt information. As shown in FIG. 26, the terminal device replaces the incoming call prompt information with default content or content edited by a user, (e.g., "Sorry. A call is coming to my master. Hand me over to my master.") After viewing this content, the friend may deliver the terminal device to the owner of the terminal device. After the terminal device is delivered, the front camera of the terminal device detects a face in front of the screen. When the user who is using the terminal device is the owner of the terminal device, the terminal device displays incoming call prompt information 2620. After the call is received, the friend may still want to view images, and the owner of the terminal device may deliver the terminal device to the friend again. In this case, the front camera of the terminal device determines whether the user who is using the terminal device is the owner of the terminal device and resumes a privacy mode 2630 as shown in FIG. 26 when the user is not the owner.

Figure 27:
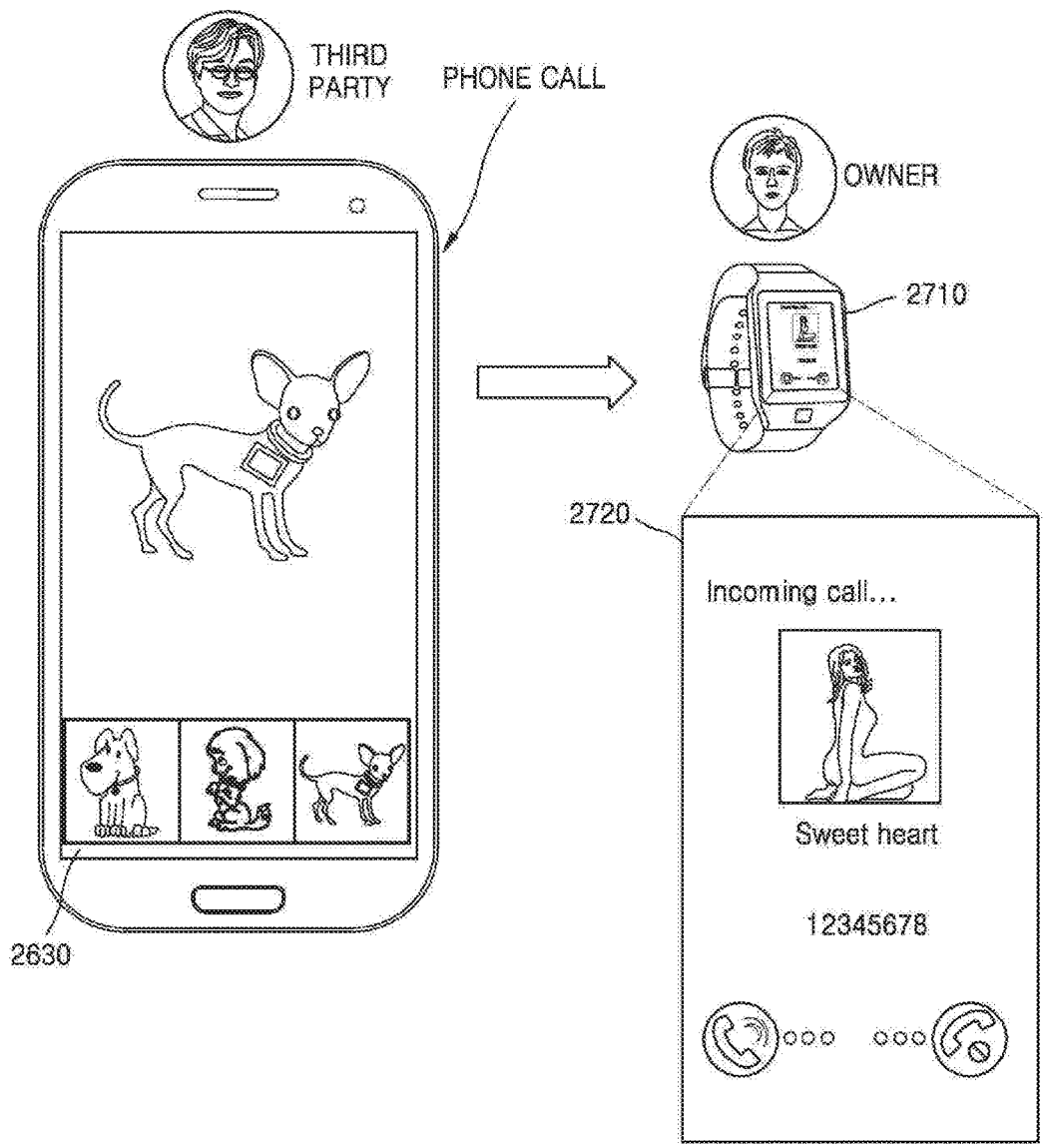
FIG. 27 is a diagram showing an example of transmitting incoming call prompt information to an external controller of an owner of a terminal device in a privacy protection mode according to an exemplary embodiment.

Also, for example, when the privacy mode is switched on and incoming call prompt information is received, the terminal device determines whether the incoming call prompt information includes private information. When the incoming call prompt information includes the private information, the terminal device determines whether a user who is using the terminal device is the owner of the terminal device through a front camera. When the user is not the owner, the prompt information protection function is executed. The terminal device continues to display the content and transmits the incoming call prompt information 2720 to an external controller of the owner of the terminal device in order to display the incoming call prompt information as shown in FIG. 27. When the owner of the terminal device receives a call, this does not affect the friend's viewing of multimedia content from the terminal device.

In addition, the user may determine the prompt information of which application needs to be protected, and may configure whether all information or only a part of the information in the application needs to be protected, or may configure whether information of some contacts needs to be protected.

For example, the user may identify some content of the application as private content and merely the private content of the application needs to be protected whereas other content does not. For example, in the text messaging application, the user may identify one or more keywords as content to be hidden. In the privacy mode, if a text message containing a selected keyword is received, the terminal device hides the text message; otherwise, the terminal device does not hide the text message.

For another example, the user may identify some contacts as private contacts. If the received information such as an incoming call, a text message, or a chat message (i.e., instant message) is from a private contact, the information is hidden; otherwise, the information is not hidden.

In addition, after the privacy mode is switched on, it is also possible to prevent the use of a designated application, prevent the use of a designated function of a designated application, and/or prevent access of the multimedia content determined to be private. As such, privacy protection may be provided to applications and functions that may contain private information.

In particular, after the privacy mode is switched on, it is detected whether the user currently using the terminal device is the owner. If the user currently using the terminal device is not the owner, the use of designated application and/or designated function of a designated application is forbidden, and accessing the multimedia content which is determined to be private is forbidden. The designated application may be selected by the user in advance, and/or an application associated with known private information. The designated function may be selected by the user, and/or a function associated with known private information.

For example, after the terminal device switches on the privacy mode, if the terminal device is in the hand of a friend, the friend may use a function of the photo album application (e.g., transmit and share functions), which may lead to invasion of privacy. According to an exemplary embodiment, after switching on the privacy mode, the terminal device starts the front camera to detect the face in front of the screen. The terminal device determines whether the user currently using the terminal device is the owner. If the user is not the owner, privacy-related functions of the photo album application such as share, transmit, edit, delete, and settings are forbidden. Thus, unauthorized users are prevented from transmitting content stored in the terminal device to other devices or to the network. The unauthorized users are also prevented from unintentionally performing operations to the terminal device which may modify or delete the multimedia content in the terminal device. The prevented functions may be configured by the user in advance.

Figure 28:
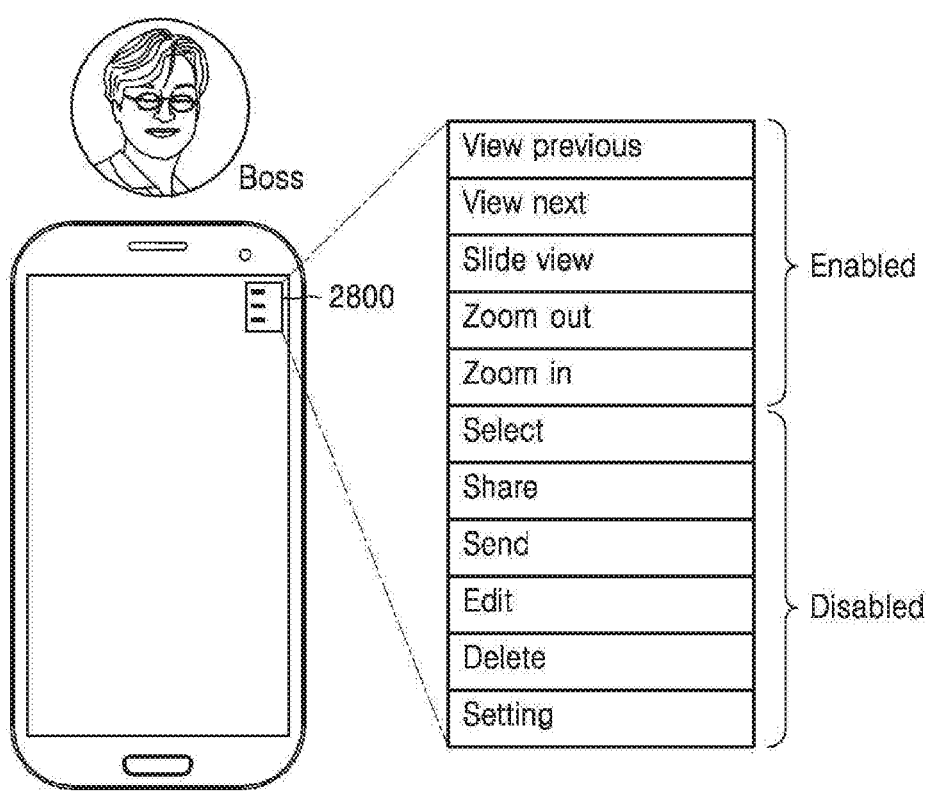
FIG. 28 is a diagram showing a user interface that prevents a function associated with a photo album application from being used after a privacy mode is switched on according to an exemplary embodiment.

FIG. 28 is a diagram showing a user interface that prevents a function associated with a photo album application from being used after a privacy mode is switched on according to an exemplary embodiment. As shown in FIG. 28, when another user uses a terminal device, some functions of the photo album application cannot be used. For example, when the other user uses the photo album application through the terminal device, a slideshow, a zoom-in, or a zoom-out may be enabled, and a menu items such as photo sharing, photo transmission, photo editing, photo deletion, and photo setting may be disabled. When an attempt to perform an unauthorized operation is detected, prompt information may be provided as a sound, and may also be provided on a screen of a connected device.

For another example, suppose that the terminal device has switched on the privacy mode. The terminal device starts the front camera to detect the face in front of the screen and determines whether the user currently using the terminal device is the owner. If the user is not the owner, when an application such as an instant messaging app is started, the terminal device automatically disables the recall stored password and automatic login functions and clears the user name and the password. If the current user wants to use the instant messaging application, he needs to log in by using his own account and password information. After logging in, if the user wants to access multimedia content, the is only allowed to access the multimedia content that is designated public and the newly added multimedia content after the privacy mode is switched on. After the privacy mode is switched off, all configurations in the privacy mode are resumed to previous states, which do not affect the subsequent usage of the user.

Further, after the privacy mode is switched on, if another application accesses the multimedia content in the photo album application, it is only allowed to access the multimedia content that was newly added after the privacy mode is switched on or the multimedia content that is determined to be public.

In the above method provided by the exemplary embodiment, it is possible to provide privacy protection to prompt information of an application.

According to an exemplary embodiment, after the privacy mode is switched on, it is also possible to hide private information in a designated application of the terminal device (e.g., privacy-related history information), so as to provide protection to the private information in the designated application.

In particular, after the privacy mode is switched on, the terminal device hides the private information of a designated application. Or, after the privacy mode is switched on, the terminal device detects whether the user currently using the terminal device is the owner. If the user is not the owner, the terminal device hides the private information in the designated application. The private information in the designated application may include text messages, contacts information, call records, notebook information, a web browsing history, and favorites folder information.

Figure 29:
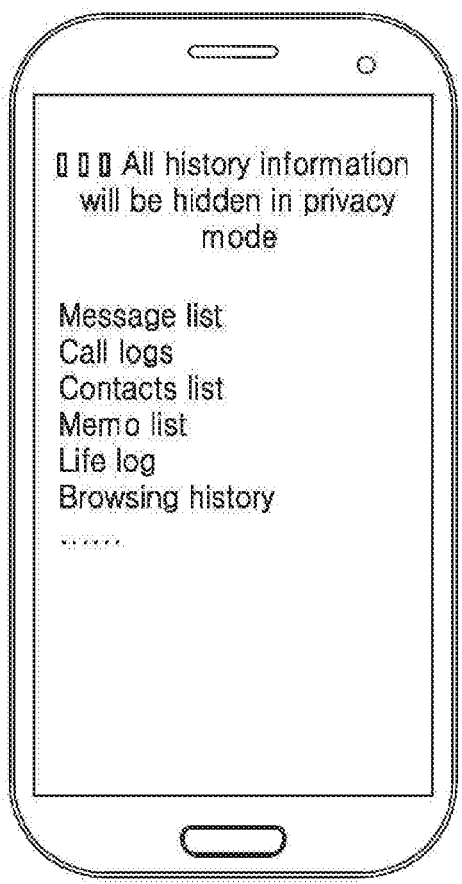
FIG. 29 is a diagram showing a screen that informs a user of information to be hidden after a privacy mode is switched on according to an exemplary embodiment.
Figure 30:
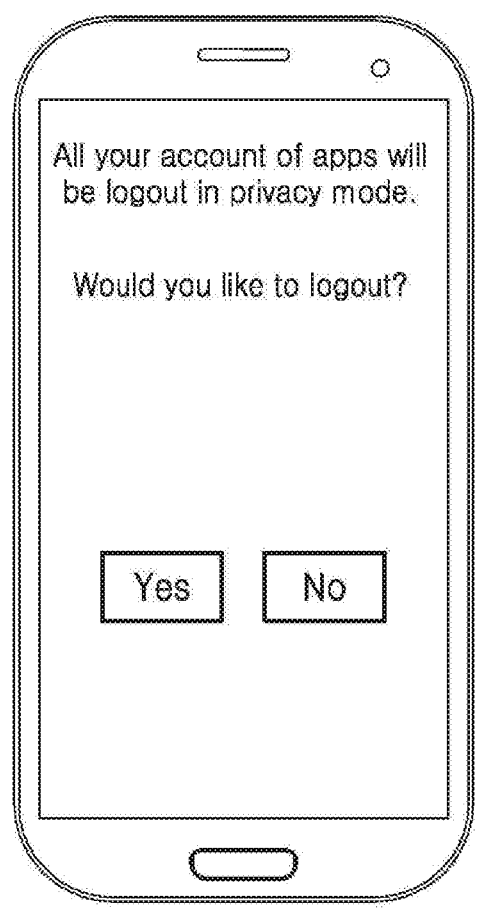
FIG. 30 is a diagram showing a screen that informs a user that all applications will be logged out of user accounts in a privacy protection mode according to an exemplary embodiment.

For example, as shown in FIG. 29, the privacy mode is turned on, and private information of some applications, including a text message list, a contact list, a call history, notebook information, life log information, web search records, and a network favorite folder, is temporarily hidden. The terminal device may enable a user to select automatic hiding by default or enable the user to select an item to be hidden after the privacy mode is switched on. For example, as shown in FIG. 30, the terminal device may inform the user that applications will be logged out of user accounts in the privacy mode, and may display a message that asks for confirmation about whether to log out of the accounts.

Furthermore, when prompting the user whether to hide the private information, the terminal device may provide more detailed information to the user (e.g., a detailed list of the applications that needs to be protected, the private information corresponding to each application, time period of the private information, classification option of the private information, etc.) for the user to configure the detailed content that needs to be hidden.

In addition, the terminal device also allows the user to select options to hide the whole application or hide some functions of an application. After the user configures to hide the whole application, the application is invisible for the user in the privacy mode. When the user configures to hide some functions of the application, the application may be opened in the privacy mode, but some functions are disabled during usage according to the configuration of the user. For example, as to instant messaging application, if the user switches on the privacy mode, the user may select to forbid file transmission and viewing of chat history record. When the instant messaging application is opened in the privacy mode, other users cannot use the file transmission function and also cannot see the chat history record of the application, which does not affect normal usage of the application and protects the privacy of the user according to the user's requirement.

For example, suppose that the terminal device has switched on the privacy mode. The terminal device starts the front camera to detect a face in front of the screen and determines whether the user currently using the terminal device is the owner. If the user is not the owner, when an application such as text messaging application is opened, all history information of the application is hidden. As such, the history information is protected. If another user wants to use the text messaging application, the text message that is transmitted at this time is automatically added with alert information (e.g., text information "[not sent by the owner]"). At the same time, other users are not allowed to forward history information. Alternatively, the other users are merely allowed to access the multimedia content and/or information newly added after the privacy mode is switched on.

According to the embodiments illustrated above, the privacy mode may be switched off (i.e., deactivated) by automatic deactivation or manual deactivation.

If it is detected that the user currently using the terminal device is the owner or a trusted user, and/or it is detected that the environment type of the current environment of the terminal device is a safe environment (e.g., home), the terminal device may automatically switch off the privacy mode.

The terminal device may detect whether the user currently using the terminal device is the owner or the trusted user via a front-facing imaging apparatus and/or biometric feature. The terminal device may determine whether the current environment is safe by using an imaging apparatus, a microphone, and/or GPS.

With automatic deactivation, there are two situations: secure deactivation and partial deactivation. If it is detected that the user currently using the terminal device is the owner and the current environment is safe and this situation has lasted for a certain period of time, the terminal device completely switches off the privacy mode. After the privacy mode is switched on, if the terminal device receives incoming call prompt information or text message prompt information, in the case that the owner is using the terminal device, the terminal device may automatically partially switch off the privacy mode and display the incoming call or text message prompt information, but may keep other protection states unchanged (e.g., keeping the public multimedia content list in the photo album application unchanged). When the terminal device is returned to the other user (not the owner), the terminal device is switched to the privacy mode.

The manual deactivation refers to the user manually switching off the privacy mode via some manners such as: controlling the terminal device using, for example, password, button, gesture, biometric feature (e.g., fingerprint feature, signature feature, voiceprint feature, etc.), voice, augmented reality man-machine interactive interface, and external controller.

According to the various exemplary embodiments discussed above, it is possible to provide protection to a designated application in the terminal device and/or a designated function of the designated application. It is also possible to provide privacy protection to private information in the designated application of the terminal device.

Figure 31:
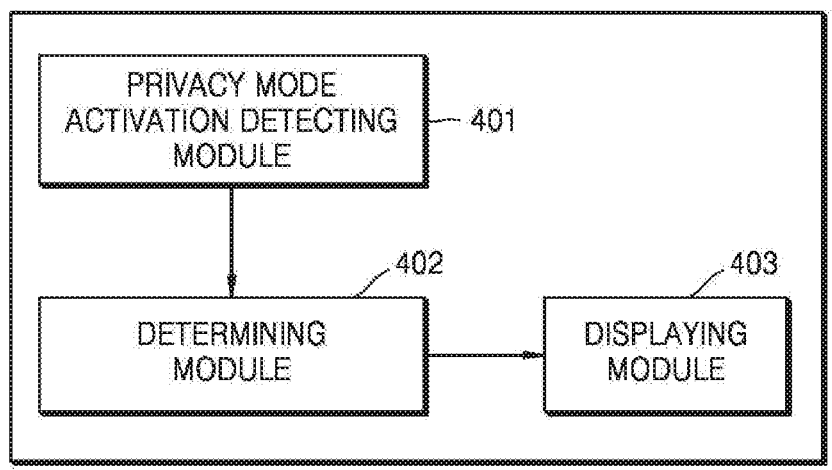
FIG. 31 is a block diagram showing a privacy protection apparatus according to an exemplary embodiment.

FIG. 31 is a block diagram showing a privacy protection apparatus applied to a terminal device according to an exemplary embodiment. As shown in FIG. 31, the privacy protection apparatus may further include a privacy mode activation detecting module 401, a determining module 402, and a displaying module 403. The determining module 402 may be implemented with a processor. Various modules depicted in FIG. 31 and other figures may be implemented with software, hardware, or a combination of both.

The privacy mode activation detecting module 401 is configured to detect activation of privacy mode.

The determining module 402 is configured to determine a private multimedia content set based on designated multimedia content.

The displaying module 403 is configured to hide the private multimedia content set determined by the determining module 402.

The designated multimedia content includes at least one of: multimedia content in a designated multimedia file; designated content in the designated multimedia file; multimedia content corresponding to a designated subject; multimedia content corresponding to a subject of the designated multimedia file; multimedia content containing a designated object; multimedia content containing an object in the designated multimedia file; multimedia content including designated private information; multimedia content containing private information in the designated multimedia file; multimedia content corresponding to a user type of the current user; and multimedia content corresponding to an environment type of the current environment.

The determining module 402 includes a content searching unit and a public set determining unit; wherein the content searching unit is configured to find multimedia content having the same semantic information with the designated multimedia content; and the viewable set determining unit is configured to determine the private multimedia content set based on the multimedia content found by the content searching unit.

The public set determining unit may determine the private multimedia content set via at least one of the following manners: if an instruction for showing the designated multimedia content is detected, excluding the found multimedia content from the private multimedia content set; if an instruction for hiding the designated multimedia content is detected, including the found multimedia content in the private multimedia content set; if the designated multimedia content conforms to a hide criterion, including the found multimedia content in the private multimedia content set; and if the designated multimedia content conforms to a show criterion, excluding the found multimedia content from the private multimedia content set.

The hide criterion includes: the designated multimedia content includes designated private information; and/or, the subject of the designated multimedia content is the designated subject. The show criterion includes at least one of: the designated multimedia content does not include designated private information; the subject of the designated multimedia content is not the designated subject; and the multimedia content only includes the user currently using the terminal device.

The semantic information includes at least one of: object, number of objects, scene, and event.

The determining module 402 is further configured to determine the private multimedia content set based on the designated multimedia content via at least one of the following: excluding the multimedia content which was shown in history from the private multimedia content set; including the multimedia content which was hidden in history in the private multimedia content set; excluding the multimedia content associated with the multimedia content which is currently determined to be viewable from the private multimedia content set; and including the multimedia content associated with the multimedia content which is currently determined to be hidden in the private multimedia content set.

The determining module 402 includes an integrated displaying unit and a sorting and displaying unit. When determining the private multimedia content set based on the designated multimedia content, the integrated displaying unit is configured to display the multimedia content which is currently determined to be viewable in an integrated manner or display the multimedia content which is currently determined to be hidden in an integrated manner; and when determining the private multimedia content set based on the designated multimedia set, the sorting and displaying unit is configured to sort the multimedia content excluding the multimedia content which is currently determined to be viewable or to be hidden and display the sorted multimedia content.

The sorting and displaying unit is further configured to sort the multimedia content based on at least one of: similarity to the multimedia content which is determined to be viewable or to be hidden; a corresponding subject, a corresponding object, and contained private information.

Before displaying the sorted multimedia content, the sorting and displaying unit is further configured to determine, among the remaining multimedia content, the multimedia content having the same degree of similarity with respect to the multimedia content which is determined to be viewable or to be hidden, and display the determined multimedia content in the integrated manner or display a designated number of the determined multimedia content preferably.

The privacy mode activation detecting module 401 is configured to detect the activation of the private module via detecting at least one of the following inputs: voice, button, gesture, biometric feature, augmented reality man-machine interactive interface, and external controller.

If the privacy mode activation detecting module 401 detects the activation of the privacy mode via the external controller, the determining module 402 includes: a sorting and displaying unit and a viewable set determining unit; wherein the sorting and displaying unit is configured to sort the multimedia content not having been viewed based on at least one of subject, object and private information corresponding to the multimedia content and display the sorted multimedia content after the switching-on detecting module 401 detects a privacy mode activation instruction transmitted by the external controller; and the public set determining unit is configured to determine, after detecting a configuration instruction corresponding to the private multimedia content set transmitted by the external controller, the private multimedia content set according to configuration instruction.

The displaying module 403 includes: a sorting unit and a content displaying unit; wherein the sorting unit is configured to sort the public multimedia content according to at least one of the following information: similarity to the designated multimedia content, corresponding subject, corresponding object, contained private information; and the content displaying unit is configured to display the sorted multimedia content.

Figure 32:
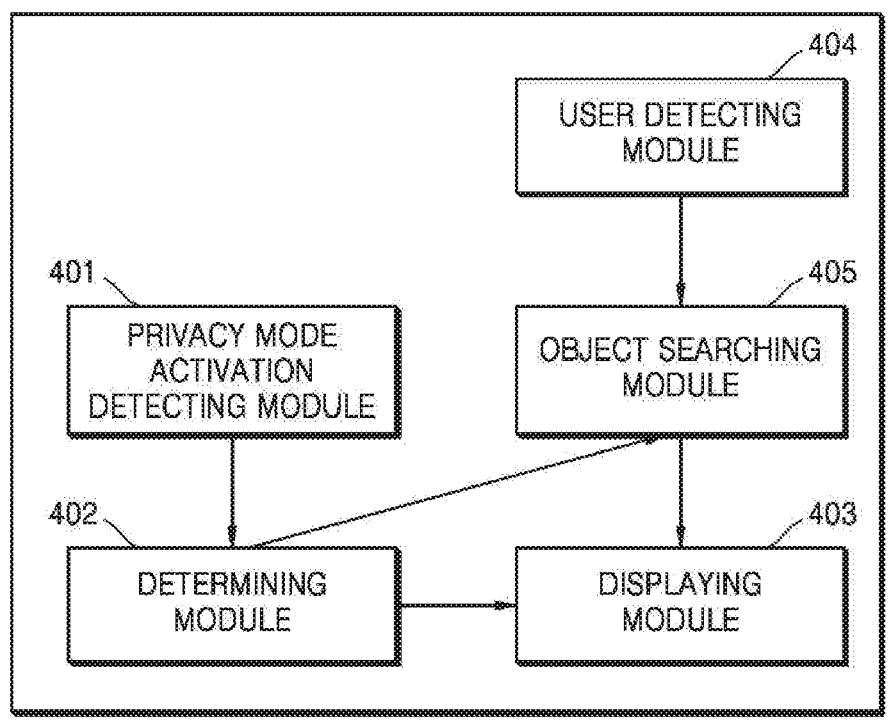
FIG. 32 is a block diagram showing a privacy protection apparatus according to an exemplary embodiment.

FIG. 32 is a block diagram showing a privacy protection apparatus according to an exemplary embodiment. As shown in FIG. 32, the privacy protection apparatus may further include a user detecting module 404 and an object searching module 405. The object searching module 405 may be implemented with a processor.

The user detecting module 404 is configured to detect a user currently using the terminal device. The object searching module 405 is configured to search the private multimedia content set determined by the determining module 402 for multimedia content that only contains the detected user.

The displaying module 403 is further configured to display the multimedia content found by the object searching module 405.

In some exemplary embodiments, the privacy protection apparatus may further include an adjusting module, configured to adjust, after detecting a multimedia content set adjusting instruction transmitted by the external controller, the private multimedia content set according to the multimedia content set adjusting instruction.

Figure 33:
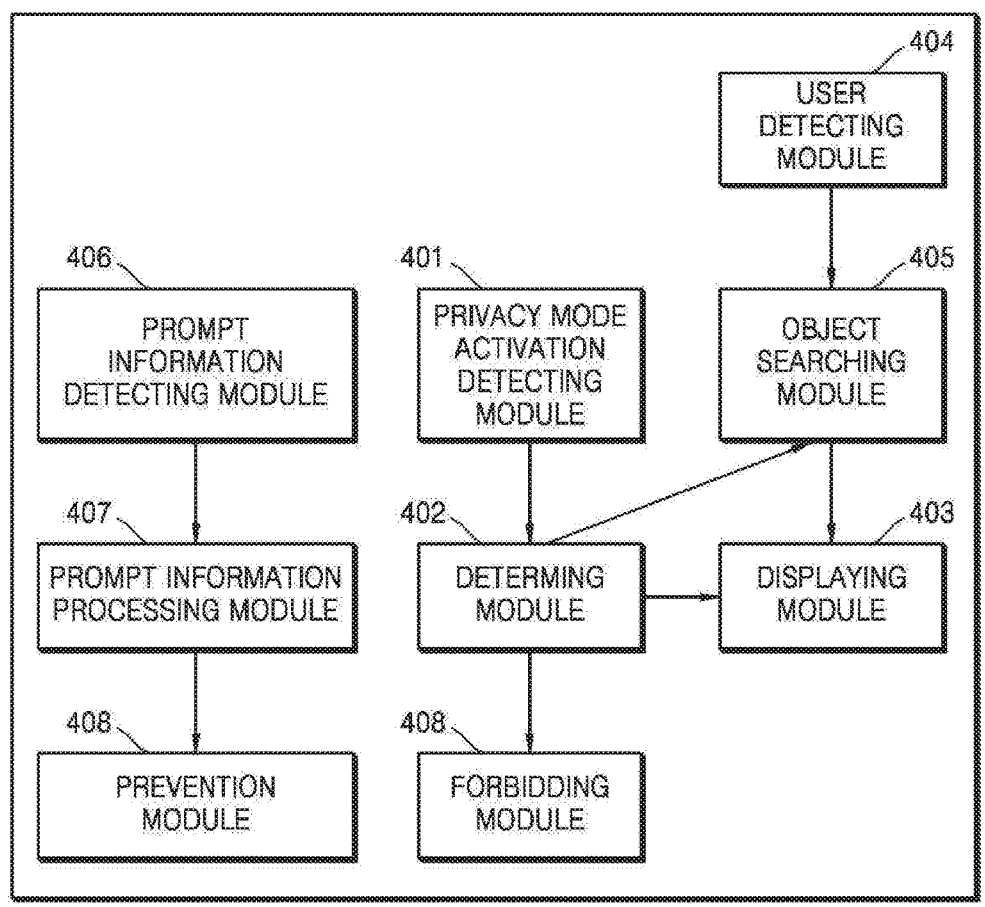
FIG. 33 is a block diagram showing a privacy protection apparatus according to an exemplary embodiment.

FIG. 33 is a block diagram showing a privacy protection apparatus according to an exemplary embodiment.

As shown in FIG. 33, the privacy protection apparatus may further include a prompt information detecting module 406 and a prompt information processing module 407. The prompt information detecting module 406 and the prompt information processing module 407 may be implemented with a processor.

The prompt information detecting module 406 is configured to detect application prompt information to be displayed.

The prompt information processing module 407 is configured to hide private information contained in the application prompt information detected by the prompt information detecting module 406, or transmit the private information contained in the application prompt information to another terminal device for display.

The application prompt information may include at least one of: incoming call prompt information, text message prompt information, chat message prompt information, email prompt information, schedule prompt information and memo prompt information.

As shown in FIG. 33, the privacy protection apparatus may further include: a prevention module 408, configured to perform at least one of the following operations: preventing the use of a designated application; preventing the use of a designated function of the designated application; preventing access to the private multimedia content determined by the determining module 402; and hiding the private information in the designated application.

According to an exemplary embodiment, the multimedia content includes at least one of: an image, a part of an image, a video, a video segment, a video image frame, a part of a video image frame, an audio, and an audio segment.

Furthermore, some exemplary embodiments also provide a privacy protection method applicable to an external controller. The above terminal device may be referred to as a second terminal device, and the external controller may be referred to as a first terminal device. The method includes the following: the first terminal device determining a private multimedia content set during privacy protection of the second terminal device based on designated multimedia content; and the first terminal device transmitting a configuration instruction corresponding to the private multimedia content set to the second terminal device.

In some exemplary embodiments, before the first terminal device determines the private multimedia content set during the privacy protection of the second terminal device, the method may further include: when detecting that the privacy mode of the second terminal device is not switched on, the first terminal device transmitting a privacy mode activation instruction to the second terminal device.

In some exemplary embodiments, before the first terminal device determines the private multimedia content set during the privacy protection of the second terminal device, the method may further include: the first terminal device sorting the multimedia content not having been viewed in the second terminal device according to at least one of: subject, object and private information corresponding to the multimedia content; and the first terminal device displaying the sorted multimedia content.

In some exemplary embodiments, the process of the first terminal device determining the private multimedia content set during the privacy protection of the second terminal device may include: when detecting that the second terminal device has switched on the privacy mode, the first terminal device determining an adjusted multimedia content set after adjusting the private multimedia content set of the second terminal device during the privacy protection based on the designated multimedia content; and the process of the first terminal device transmitting the configuration instruction corresponding to the private multimedia content set to the second terminal device includes: the first terminal device transmitting the multimedia content set adjusting instruction corresponding to the adjusted private multimedia content set to the second terminal device.

In addition, some exemplary embodiments provide a privacy protection apparatus applicable to the external controller (the first terminal device).

Figure 34:
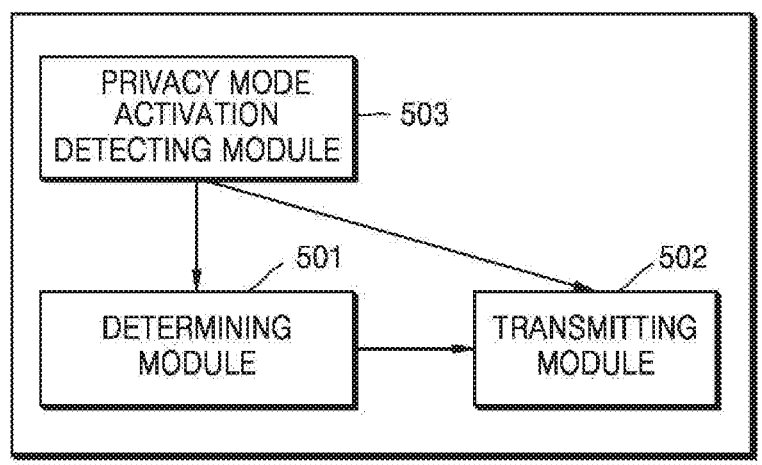
FIG. 34 is a block diagram showing a privacy protection apparatus that uses an external controller according to an exemplary embodiment.

FIG. 34 is a block diagram showing a privacy protection apparatus that uses an external controller according to an exemplary embodiment. As shown in FIG. 34, the privacy protection apparatus may include a determining module 501 and a transmitting module 502. The determining module 501 may be implemented with a processor.

The determining module 501 is configured to determine a private multimedia content set during privacy protection of a second terminal device based on designated multimedia content.

The transmitting module 502 is configured to transmit a configuration instruction corresponding to the private multimedia content set determined by the determining module 501 to the second terminal device.

As shown in FIG. 34, the apparatus may further include a privacy mode activation detecting module 503, configured to detect whether the second terminal device has switched on the privacy mode before the determining module 501 determines the private multimedia content set during the privacy protection of the second terminal device; and the transmitting module 502 is further configured to transmit a privacy mode activation instruction to the second terminal device if the privacy mode activation detecting module 503 detects that the second terminal device has not switched on the privacy mode.

Figure 35:
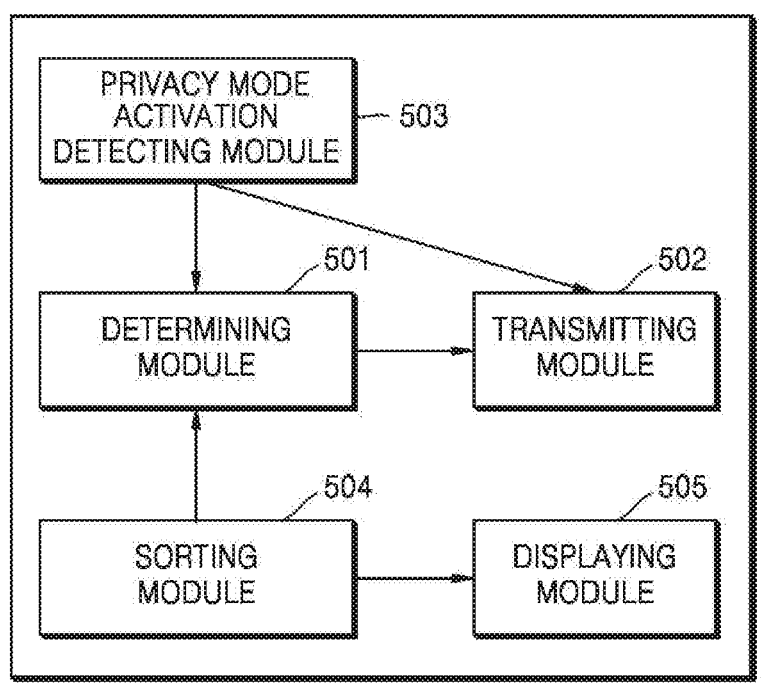
FIG. 35 is a block diagram showing a privacy protection apparatus that uses an external controller according to an exemplary embodiment.

FIG. 35 is a block diagram showing a privacy protection apparatus that uses an external controller according to an exemplary embodiment.

As shown in FIG. 35, the privacy protection apparatus may further include a sorting module 504 and a displaying module 505. The sorting module 504 may be implemented with a processor.

The sorting module 504 is configured to sort the multimedia content not having been viewed in the second terminal device according to at least one of: subject, object and private information corresponding to the multimedia content before the determining module 501 determines the private multimedia content set during the privacy protection of the second terminal device; and the displaying module 505 is configured to display the multimedia content sorted by the sorting module 504.

In some exemplary embodiments, the determining module 501 is further configured to determine, after the privacy mode activation detecting module 503 detects that the second terminal device has switched on the privacy mode, an adjusted multimedia content set after the private multimedia content set during the privacy protection of the second terminal device is adjusted based on the designated multimedia content; and the transmitting module 502 is further configured to transmit a multimedia content set adjusting instruction corresponding to the adjusted private multimedia content set to the second terminal device.

In view of the above, the exemplary embodiments may have the following technical effects: (1) The terminal device detects the privacy mode activation of the privacy mode, determines the private multimedia content set based on the designated multimedia content and hides the private multimedia content set. As such, privacy protection of the multimedia content may be achieved.

(2) The user merely needs to designate the multimedia content. The terminal device is able to find the multimedia content having the same semantic information with the designated multimedia content. After detecting the instruction for showing the designated multimedia content of the user, the terminal device is able to determine that the public multimedia content set includes the found multimedia content and the private multimedia content set does not include the found multimedia content. After detecting the instruction for hiding the designated multimedia content, the terminal device is able to determine that the public multimedia content set does not include the found multimedia content and the private multimedia content set includes the found multimedia content. The user merely needs to designate fewer multimedia content items to hide the relevant multimedia content, which does not require one-by-one selection and configuration of the private multimedia content, which simplifies the operation and increases efficiency.

(3) Privacy protection can be provided not only to a complete video, but also to a video image frame in the video, a video segment and/or a part of the video image frame, which meets various privacy protection requirements of the user.

(4) In order to facilitate the user to configure the designated multimedia content again, it is possible to display the multimedia content which has been determined to be hidden or viewable in an integrated manner, and display the other multimedia content after sorting them, which facilitates the user to have a quick view.

(5) Various methods of issuing instructions are provided. Therefore, instruction may be issued in a flexible manner.

(6) The user may designate at least one of: subject type, object type and privacy type, the terminal device is able to determine, based on the type designated by the user, the private multimedia content (or available for public viewing) conforming to the above designated type. Alternatively, the user may designate multimedia content, the terminal device is able to determine at least one of subject type, object type and privacy type of the designated multimedia content based on the multimedia content designated by the user, and then determine the private multimedia content (or available for public viewing) conforming to the above determined type. As such, the relevant multimedia content may be hidden. It does not need the one-by-one selection and configuration to the private multimedia content, simplifies the operation and increases efficiency.

(7) The terminal device is able to automatically determine the private multimedia content set and the public multimedia content set based on the user type of the current user and/or the environment type of the current environment, which enables automatic determination of the privacy protection scope, simplifies the operation, and increases efficiency.

(8) The terminal device is able to automatically find the private multimedia content set and the public multimedia content set using quick activation. In some special cases, (e.g., the terminal device is used by a user other than the owner while the privacy mode is not switched on), the terminal device is able to automatically switch on the privacy mode and provide privacy protection to the private multimedia content using quick activation of the privacy mode.

(9) The private multimedia content set and the public multimedia content set may be adjusted. In particular, the multimedia content which was shown in history is determined as content included in the public multimedia content set, the multimedia content which was hidden in history is determined as content not included in the public multimedia content set, the multimedia content set associated with the multimedia content which is currently determined to be viewable is determined as content included in the public multimedia content set, and the multimedia content associated with the multimedia content which is currently determined to be hidden is determined as content not included in the public multimedia content set; and/or, after the privacy mode is switched on, the multimedia content that only includes the current user is additionally displayed. As such, various manners for adjusting the private multimedia content set and the public multimedia content set are provided. The adjustments are seamlessly made according to various requirements of the user.

(10) Privacy protection may be provided to the prompt information of an application. In addition, privacy protection may be provided to a designated application and/or a designated function of the designated application, or provided to private information of the designated application of the terminal device.

Various exemplary embodiments described above may be implemented as computer-executable programs and may be implemented in general-purpose digital computers that execute the programs using a computer-readable recording medium. In addition, a structure of data used in the exemplary embodiments may be recorded in the computer-readable recording medium in various ways. Also, the exemplary embodiments may be implemented as a recording medium including computer-executable instructions such as a computer-executable program module. For example, methods that are implemented as software modules or algorithms may be code or program instructions readable and executable by a computer and may be stored in a computer-readable medium.

The computer-readable recording medium may be any recording medium accessible by a computer and may include volatile and non-volatile media and discrete and integrated media. The computer-readable recording medium may include, but is not limited to, storage media such as magnetic storage media (e.g., ROMs, floppy disks, and hard disks), optical recording media (e.g., compact disc read-only memories (CD-ROMs) and digital versatile discs (DVDs)), etc. Also, the computer-readable recording medium may include both a computer storage medium and a communication medium.

Also, a plurality of computer-readable recording media may be distributed over network-coupled computer systems, and data stored in the distributed recording media, for example, program instructions and code, may be executed by at least one computer.

It should be appreciated that the particular implementations shown and described herein are illustrative of the invention and are not intended to otherwise limit the scope of the present invention in any way. For the sake of brevity, conventional electronics, control systems, software, and other functional aspects of the systems may not be described in detail.

The above description is merely illustrative, and those skilled in the art should understand that various changes in form and details may be made therein without departing from the spirit and scope of the invention as defined by the appended claims. The above exemplary embodiments are to be accordingly regarded as illustrative rather than restrictive. For example, while a single element may be distributed and then carried out, distributed elements may be carried out in a combination thereof.

The use of any and all examples, or exemplary language (e.g., "such as" or "for example") provided herein, is intended merely to better illuminate this disclosure and does not impose a limitation on the scope of the appended claims unless otherwise claimed.

Moreover, the elements described herein may not be necessary for the practice of the present disclosure.

Those skilled in the art should understand that various changes in form and detail may be made therein without departing from the spirit and scope of the present disclosure as defined by the appended claims.

The present disclosure may be modified in various ways and may have several exemplary embodiments. It should be understood that the present disclosure is not limited to the particular exemplary embodiment disclosed and covers all modifications, equivalents, and alternatives falling within the spirit and scope of the disclosure. Therefore, the disclosed exemplary embodiments should be considered in descriptive sense only and not for purposes of limitation.

The scope of the present disclosure is defined not by the detailed description but by the appended claims, and all changes or modifications within the appended claims and their equivalents should be construed as being included in the scope of the disclosure.

Also, terms such as "unit" and "module" indicate a unit for processing at least one function or operation, and such a unit may be implemented by hardware, software, or a combination of hardware and software.

A "unit" or a "module" may be stored in an addressable storage medium and may be implemented as a program executable on a processor.

For example, a "unit" or a "module" may be implemented with elements such as software elements, object-oriented software elements, class elements, and task elements, processes, functions, attributes, procedures, sub-routines, segments of program codes, drivers, firmware, micro-codes, circuits, data, database, data structures, tables, arrays, and variables.

What is claimed is:

1. A privacy protection method in a terminal device, the privacy protection method comprising:
   receiving a first user input to designate a multimedia content in the terminal device;
   in response to the first user input, identifying, from multimedia contents stored in the terminal device, a set of multimedia contents based on at least one of semantic information, a particular type, a user type, and an environment type, in association with the designated multimedia content;
   determining whether the identified set of multimedia contents is to be shown or hidden and displaying on a display of the terminal device, a first group of the identified set of multimedia contents and a second group of remaining multimedia contents other than the identified set of multimedia contents;
receiving a second user input; and
in response to the second user input,
displaying the identified set of multimedia contents determined to be shown.

2. The privacy protection method of claim 1, wherein the identifying the set of multimedia contents comprises:
obtaining the designated multimedia content; and
identifying the set of multimedia contents having the semantic information that corresponds to the designated multimedia content.

3. The privacy protection method of claim 1, wherein the identifying the set of multimedia contents comprises identifying the set of multimedia contents conforming to the particular type, and
wherein the particular type comprises at least one of: a designated subject, a subject of multimedia file designated by a user, an object in a designated multimedia file, designated private information, and private information in the designated multimedia file.

4. The privacy protection method of claim 1, wherein the designated multimedia content is obtained by receiving a user selection.

5. The privacy protection method of claim 1, wherein the semantic information includes at least one of an object, a plurality of objects, a scene, and an event.

6. The privacy protection method of claim 1, wherein the identifying the set of multimedia contents comprises:
identifying the user type of a user currently using the terminal device; and
identifying the set of multimedia contents corresponding to the user type.

7. The privacy protection method of claim 1, wherein the identifying the set of multimedia contents comprises:
identifying the environment type of an environment where the terminal device is currently located; and
identifying the set of multimedia contents satisfying the environment type.

8. The privacy protection method of claim 1, further comprising at least one of:
preventing use of a designated application;
preventing use of a designated function of the designated application;
preventing access to the identified set of multimedia contents; and
hiding private information in the designated application.

9. The privacy protection method of claim 1, wherein the designated multimedia content includes at least one of:
a multimedia content of a designated multimedia file;
a content designated from the designated multimedia file;
a multimedia content corresponding to a designated subject;
a multimedia content corresponding to a subject of the designated multimedia file;
a multimedia content including a designated object;
a multimedia content including an object of the designated multimedia file;
a multimedia content including designated private information;
a multimedia content including private information of the designated multimedia file;
a multimedia content corresponding to the user type of a current user of the terminal device; and
a multimedia content corresponding to the environment type of a current environment of the terminal device.

10. The privacy protection method of claim 1, wherein the first user input and the second user input is received from an external device through a communication interface.

11. The privacy protection method of claim 10, further comprising adjusting the set of multimedia contents based on a multimedia content set adjustment instruction transmitted by the external device in response to a detection of the multimedia content set adjustment instruction.

12. The privacy protection method of claim 1, further comprising:
detecting application prompt information to be displayed on the terminal device; and
performing at least one of:
hiding private information included in the application prompt information, and
transmitting the private information included in the application prompt information to another terminal device associated with the terminal device for displaying the private information on the another terminal device.

13. The privacy protection method of claim 12, wherein the application prompt information includes at least one of incoming call prompt information, text message prompt information, chat message prompt information, email prompt information, schedule prompt information, and memo prompt information.

14. A terminal device comprising:
a display; and
a processor configured to:
receive a first user input to designate a multimedia content in the terminal device;
in response to the first user input, identify, from multimedia contents stored in the terminal device, a set of multimedia contents based on at least one of semantic information; a particular type; a user type; and an environment type, in association with the designated multimedia content,
determine whether the identified set of multimedia contents is to be shown or hidden and display on a display of the terminal device, a first group of the identified set of multimedia contents and a second group of remaining multimedia contents other than the identified set of multimedia contents;
receive a second user input;
in response to the second user input,
display the identified set of multimedia contents determined to be shown.

15. A computer-program product comprising a non-transitive computer-readable storage medium storing instructions which, when executed by a processor, cause the processor to:
receive a first user input to designate a multimedia content in a terminal device;
in response to the first user input, identify, from multimedia contents stored in the terminal device, a set of multimedia contents based on at least one of semantic information, a particular type, a user type, and an environment type, in association with the designated multimedia content;
determine whether the identified set of multimedia contents is to be shown or hidden and displaying on a display of the terminal device, a first group of the identified set of multimedia contents and a second group of remaining multimedia contents other than the identified set of multimedia contents; and receive a second user input; and in response to the second user input, display the identified set of multimedia contents determined to be shown.

16. The computer-program product of claim 15, wherein the identifying the set of multimedia contents comprises:

obtaining the designated multimedia content; and identifying the set of multimedia contents having the semantic information that corresponds to the designated multimedia content.

17. The computer-program product of claim 15, wherein a privacy mode is activated by an authorized user of the terminal device through another device associated with the terminal device.

\* \* \* \* \*